(12) United States Patent
Mizutani et al.

(10) Patent No.: US 8,982,421 B2
(45) Date of Patent: Mar. 17, 2015

(54) METHOD AND DEVICE FOR GENERATING THRESHOLD MATRIX FOR DETERMINING STATE OF FORMATION OF DOTS COMPOSING OUTPUT IMAGE, QUANTIZER COMPRISING THRESHOLD MATRIX FOR GENERATING OUTPUT IMAGE DATA, AND IMAGE FORMING DEVICE AND STORAGE DEVICE COMPRISING THRESHOLD MATRIX

(75) Inventors: Toshiyuki Mizutani, Tokyo (JP); Kenichirou Hiramoto, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 204 days.

(21) Appl. No.: 13/696,725

(22) PCT Filed: May 9, 2011

(86) PCT No.: PCT/JP2011/060636
§ 371 (c)(1),
(2), (4) Date: Nov. 7, 2012

(87) PCT Pub. No.: WO2011/142306
PCT Pub. Date: Nov. 17, 2011

(65) Prior Publication Data
US 2013/0063786 A1 Mar. 14, 2013

(30) Foreign Application Priority Data
May 11, 2010 (JP) ................................ 2010-109119

(51) Int. Cl.
*H04N 1/40* (2006.01)
*G06K 15/02* (2006.01)
*H04N 1/405* (2006.01)

(52) U.S. Cl.
CPC .......... *G06K 15/1881* (2013.01); *H04N 1/4051* (2013.01); *G06K 15/02* (2013.01)
USPC ........... 358/3.22; 382/275; 382/264; 382/270

(58) Field of Classification Search
CPC .................................................. G06K 15/1884
See application file for complete search history.

(56) References Cited

U.S. PATENT DOCUMENTS

| 6,829,063 B1 | 12/2004 | Allebach et al. |
| 2004/0080790 A1 | 4/2004 | Abe |
| 2005/0195441 A1 | 9/2005 | Inoue |

FOREIGN PATENT DOCUMENTS

| JP | 2622429 | 4/1997 |
| JP | 2000-49626 | 2/2000 |

(Continued)

OTHER PUBLICATIONS

International Preliminary Report on Patentability and Written Opinion in Japanese and English.

(Continued)

*Primary Examiner* — Barbara Reinier
*Assistant Examiner* — Christopher D Wait
(74) *Attorney, Agent, or Firm* — Lucas & Mercanti, LLP

(57) ABSTRACT

A threshold matrix generating method includes: generating q(x, y, g) in which the number of dots in an initial dot pattern is varied; calculating an error matrix (ERR(x, y, g)) of q(x, y, g); calculating AVE(a, b) representing the uniformity of the number of dots in discrete blocks into which the dot pattern has been divided; determining two pixels, of which the dot positions are to be swapped, on the basis of ERR (x, y, g) and AVE(a, b); swapping the dot positions; calculating the evaluation value (MSE(n)) of q(x, y, g) after the positional swapping; and repeating the positional switch of the dots repeating the generation of q(x, y, g) and the positional swapping of the dots with q(x, y, g) functioning as the initial dot pattern until a q(x, y, g) satisfying MSN(n)<MSN(n−1) is obtained.

9 Claims, 37 Drawing Sheets

(56) References Cited

FOREIGN PATENT DOCUMENTS

| | | |
|---|---|---|
| JP | 2007-174272 | 7/2007 |
| JP | 4168033 | 8/2008 |
| WO | 02/065755 | 8/2002 |

OTHER PUBLICATIONS

Supplementary European Search Report EP 11 78 0563, dated: May 6, 2014 (8 pages).

Ancin H et al: "New Void-and-Cluster Method for Improved Halftone Uniformity", Journal of Electronic Imaging, SPIE / IS & T, 1000 20th St. Bellingham, WA 98225-6705, USA, vol. 8, No. 1, Jan. 1, 1999, pp. 104-111, XP000801644, ISSN: 1017-9909, DOI: 10.1117/1.482701 * the whole document *.

FIG.19A

AVE1

| 4 | 0 | 0 | 0 |
|---|---|---|---|
| 1 | 0 | -1 | 0 |
| -1 | 0 | -1 | -1 |
| 2 | 0 | 0 | -3 |

FIG.19B

AVE2

| 1 | 1 | 1 | 0 | 0 | 0 | 0 | 0 |
|---|---|---|---|---|---|---|---|
| 1 | 1 | 0 | -1 | 0 | 0 | 0 | 0 |
| 0 | 0 | 0 | 0 | 0 | 0 | 1 | -1 |
| 1 | 0 | 0 | 0 | 0 | -1 | 0 | 0 |
| 0 | -1 | 0 | 0 | -1 | 0 | 0 | -1 |
| 0 | 0 | 0 | 0 | 0 | 0 | 0 | 0 |
| 0 | 1 | 0 | 0 | 0 | 0 | -1 | -1 |
| 0 | 1 | 0 | 0 | 0 | 0 | 0 | -1 |

FIG.29

| GRADATION VALUE | DISCRETE BLOCK SIZE |
|---|---|
| $0 \leq g < 0.125$ | 128×128 |
| $0.125 \leq g < 0.25$ | 64×64 |
| $0.25 \leq g < 0.75$ | 32×32 |
| $0.75 \leq g < 0.875$ | 64×64 |
| $0.875 \leq g < 1$ | 128×128 |

FIG.30

| GRADATION VALUE | DISCRETE BLOCK SIZE |
|---|---|
| $0 \leq g < 0.125$ | 128×128 |
| $0.125 \leq g < 0.25$ | 64×64、128×128 |
| $0.25 \leq g < 0.75$ | 32×32、64×64、128×128 |
| $0.75 \leq g < 0.875$ | 64×64、128×128 |
| $0.875 \leq g < 1$ | 128×128 |

FIG.39

| 4.7 | -2.9 | 0.2 | 3.7 | 3.5 | -4.5 | -4.1 | -3.9 |
|---|---|---|---|---|---|---|---|
| -1.0 | 0.8 | 4.8 | 4.1 | -4.2 | -3.2 | 2.4 | -4.6 |
| -2.8 | -2.6 | 2.6 | -0.8 | -4.0 | -1.0 | 2.6 | -3.5 |
| -2.0 | 2.3 | -1.0 | -4.1 | 4.0 | 3.0 | -2.2 | -3.2 |
| -0.3 | 0.3 | -2.4 | -0.7 | 0.8 | -2.3 | 3.8 | -3.8 |
| 2.9 | -0.7 | 4.0 | -4.4 | -1.6 | 2.4 | -0.8 | -4.5 |
| -4.2 | -4.6 | 4.7 | -0.5 | -4.4 | 3.6 | -1.5 | -4.6 |
| -0.4 | -2.6 | 3.4 | -1.7 | 0.7 | -0.6 | -3.9 | -2.5 |

METHOD AND DEVICE FOR GENERATING THRESHOLD MATRIX FOR DETERMINING STATE OF FORMATION OF DOTS COMPOSING OUTPUT IMAGE, QUANTIZER COMPRISING THRESHOLD MATRIX FOR GENERATING OUTPUT IMAGE DATA, AND IMAGE FORMING DEVICE AND STORAGE DEVICE COMPRISING THRESHOLD MATRIX

CROSS REFERENCE TO RELATED APPLICATION

This Application is a 371 of PCT/JP2011/060636 filed on May 9, 2011 which, in turn, claimed the priority of Japanese Patent Application No 2010-109119 filed on May 11, 2010, both applications are incorporated by reference herein.

FIELD OF THE INVENTION

The present invention relates to a method of generating a threshold matrix, a threshold matrix generating device, a threshold matrix, a quantizer, and an image forming device.

DESCRIPTION OF RELATED ART

In the process of outputting a multi-gradation image onto a printing medium such as sheet of paper, quantization has widely been adopted to the multi-gradation image before obtaining an output image. The "quantization" referred to herein is a process of determining the state of formation of dots in every pixel of the output image corresponding to the pixels of the input image, in order to express an image similar to the multi-gradation image using a less number of gradation than in the input image.

Known methods of quantization include error diffusion method and dithering. Of these, the error diffusion method is disadvantageous because the calculation process is complicated and needs longer time. In contrast, the dithering is a method of quantization based on results of comparison between pixel values of pixels of the input image and the threshold values corresponding to the pixels, and is advantageous because the calculation time is much shorter than that required in the error diffusion method.

The threshold value used in the dithering for comparison with the pixel values of the individual pixels are preliminarily prepared in the form of matrix data corresponding to a predetermined number of pixels. The matrix data corresponding to the predetermined number of pixels will be referred to as "threshold matrix", hereinbelow.

The threshold matrix typically has matrix data corresponding to a pixel area having a plurality of pixels arranged in a square. The size thereof may be expressed in "the number of pixels in column"×"the number of pixels in row", that is, multiplying "the number of pixels in column" by "the number of pixels in row" (see Patent Document 1, for example).

The threshold matrix is generally corresponding to the number of pixels smaller than the number of pixels in column and row of the multi-gradation image to be dithered. In the dithering, the threshold matrix is repetitively applied to the multi-gradation image to be dithered just as tiling, to thereby quantize the multi-gradation image larger in size than the threshold matrix.

A method of generating a threshold matrix under stacking constraint conditions has been known as a method of generating the threshold matrix used for dithering (see Patent Document 2, for example).

The method of generating a threshold matrix under the stacking constraint conditions will be explained referring to a concept illustration in FIG. 33 which shows a threshold matrix generation process, and a flow chart in FIG. 34. Exemplified herein is a case where the threshold matrix is generated on the software basis using a computer having a CPU, RAM, ROM and so forth.

Upon input of an input pattern 101 illustrated in FIG. 33, the CPU determines the number of dots necessary to implement a dot pattern having the next gradation value (an output pattern 102 in FIG. 33), and adds them to the dot pattern 101 (step S101). The necessary number of dots herein is determined depending on a difference in dot ratio between the input pattern 101 and a pattern having the next gradation value. The dot ratio herein means a ratio of pixels having the dots formed therein, relative to the total pixels of the pattern.

Next, the CPU applies a preliminarily prepared spatial filter to the input dot pattern added with the necessary number of dots (step S102). Next, the CPU rearranges the location, of dots added to the input dot pattern 101, referring to the dot pattern applied with the spatial filter (step S103). The CPU then calculates evaluation values for the individual patterns before and after the rearrangement of the additional dots in step S103, compares both evaluation values (step S104), and determines whether the evaluation value of the dot pattern after the rearrangement is not smaller than the evaluation value of the dot pattern before the rearrangement (step 105). In other words, the CPU determines whether the evaluation value calculated in step S104 did not decrease as a result of the rearrangement of dots. If the evaluation value of the dot pattern after the rearrangement is not smaller than the evaluation value of the dot pattern before the rearrangement (step S105: YES), the CPU creates a dot pattern 102 having the next gradation value of the input dot pattern 101, based on the output pattern 103 immediately before the final rearrangement in step S103 (step S106), and terminates the process. If, in step S105, the evaluation value of the dot pattern after the rearrangement is smaller than the evaluation value of the dot pattern before the rearrangement (step S105: NO), the CPU returns back to the process in step S102. By repeating the processes, the dot patterns according to the individual dot ratios are created, and thereby the threshold matrix is obtained.

The description in the above, referring to FIG. 33 and FIG. 34, dealt with an exemplary case where the output pattern 102, having a larger dot ratio while keeping the locations of dots unchanged from that in the input, pattern 101, that is, a case of increase in the number of dots. A pattern, having a dot ratio still larger than that of the output pattern 102, may be created in a similar manner with redefining the output pattern 102 as the input pattern 101. For the case where the dot ratio of the output pattern 102 decreases from that of the output pattern 101, that is, for an exemplary case of decrease in the number of dots, the CPU performs similar processes so as to delete the dots from the locations having the dots arranged therein in the input, pattern 101. By the above-described method of creating the dot pattern, such as creating dot patterns according to the individual dot ratios obtained under the stacking constraint conditions, the threshold matrix having a variety of patterns with the individual dot ratio may be obtained from a single input pattern. By using each of the thus-created dot patterns with the individual dot ratio, the threshold matrix is created.

The method of generating a threshold matrix explained referring to FIG. 33 and FIG. 34 will be referred to as "space filter method", hereinbelow.

The conventional space filter method has, however, been known to be insufficient to fully suppress low-frequency components of the threshold matrix, and has been known to cause nonuniformity in the image dithered using the threshold matrix. The problem will be detailed below.

FIG. 35 illustrates an exemplary dot pattern having a dot ratio of 50%, created by the conventional space filter method. FIG. 36 is a graph showing RAPSD (Radial Average Power Spectral Density) of the dot pattern illustrated in FIG. 35. In FIG. 36, frequency in the radial direction is given in [cycle/pixel].

As seen in FIG. 36, the conventional space filter method is insufficient to fully suppress low-frequency components in the RAPSD (RAPSD values at around 0.0 [cycle/pixel] on the abscissa).

FIG. 37 shows a two-dimensional spatial frequency distribution (two-dimensional Wiener spectrum) of the dot pattern illustrated in FIG. 35. The center "o" of FIG. 37 corresponds to DC components, the u-direction corresponds to frequency components in the x-direction in FIG. 35, and the v-direction corresponds to frequency components in the y-direction in FIG. 35. Darkness in the drawing means absence of components in the frequency range, and brightness means abundance of components in the frequency range.

As illustrated in FIG. 37, the two-dimensional spatial frequency characteristics of the dot pattern obtained by the conventional space filter method is isotropic, in other words, the spectrum gives almost same shape of RAPSD when seen in the linear section taken along all directions at arbitrary angles θ defined between the u-direction and the v-direction.

However, the dot pattern created by the conventional isotropic space filter method has been insufficient to suppress the low-frequency components.

FIG. 38 illustrates an exemplary dot pattern (256×256 [pixels]) with g=0.5, created by the conventional isotropic space filter method.

FIG. 39 is a table with values arranged therein, each value being obtained by dividing the dot pattern illustrated in FIG. 38 into discrete blocks of 32×32 [pixels] and subtracting an average number of dots from the total number of dots which appear in each discrete block. In the illustrated example of FIG. 39, the average number of dots which appear in each discrete block is given as 32×32×0.5=512. It is understood that, even a pattern which seemingly has a uniform distribution of dots as illustrated in FIG. 39 causes therein a spatial nonuniformity in density.

Dithering using such threshold matrix causing therein, spatial nonuniformity in dot distribution may result in nonuniformity in density in the dithered image according to a periodicity of the threshold matrix. This sort of nonuniformity in density is sensed by human eyes as a periodical pattern which has not been found in the multi-gradation image before being dithered. The nonuniformity in density becomes more explicit as the repeating cycle of the threshold matrix approaches the cycle visible to the eyes. The cycle of the threshold matrix herein may be derived from the size of the threshold matrix and resolution of printed image. On the other hand, frequency characteristics visible to the eyes are typically defined by visual transfer function. As described in the above, the dithering using the threshold matrix according to the conventional space filter method causes the nonuniformity in the dithered image.

There is also known a method of generating a threshold matrix aimed at reducing nonuniformity in dot density, by dividing the image area of the threshold matrix into the discrete blocks and by averaging the number of dots in the individual discrete blocks (see Patent Document 3, for example). According to the method of generating a threshold matrix described in Patent Document 3, if there is a discrete block already having a predetermined number of dots, the process is proceeded so as to not to generate new dots in the discrete block already having a predetermined number of dots, until the other discrete blocks become to have the predetermined number of dots, to thereby reduce the nonuniformity in dot density.

PRIOR ART DOCUMENTS

Patent Documents

Patent Document 1: Japanese Patent No 4168033
Patent Document 2 Japanese Patent No. 2622429
Patent Document 3: Japanese Laid-Open Patent Publication No 2000-49626.

SUMMARY

Problems to be Solved by the Invention

The method of generating a threshold matrix described in Patent Document 3, however, needs a strict arrangement control in the process of arrangement of dots, so that the created threshold matrix only gives a poorly dispersed dot pattern, to thereby produce nonuniformity in density in the dithered image.

It is therefore an object of the present invention to reduce the nonuniformity in density in the dithered image, in a more successful manner.

Means for Solving the Problems

According to an invention described in Claim 1, there is provided a method of generating a threshold matrix used for determining a state of formation of a plurality of dots composing an output image. The method includes: generating a new dot pattern as a second dot pattern obtained by increasing or decreasing the number of dots of a first dot pattern having a predetermined number of dots in an pixel area of a predetermined size; rearranging the dots contained in the second dot pattern to obtain a third dot pattern having the dots rearranged therein; and repeating the generating of the new dot pattern while redefining the third dot pattern as the first dot pattern and the rearranging until a dot pattern having the number of dots based on a desired dot ratio is obtained. The rearranging further includes: a dot pattern evaluation value calculating process calculating a dot pattern evaluation value based on a difference between the second dot pattern and a dot pattern obtained by subjecting the second dot pattern to a predetermined filtering aimed at implementing a desired spatial frequency, in a manner corresponding to each location in the threshold matrix; a first uniformity evaluation value calculating process calculating a first uniformity evaluation value each representing uniformity of the number of dots of first discrete blocks obtained by dividing the pixel area of a predetermined size; a dot rearrangement location determining process determining new locations of placement of dots and locations of deletion of dots in the process of rearrangement of dots, based on the dot pattern evaluation value and the first uniformity evaluation value; a rearrangement pattern generating process rearranging the dots of the third dot pattern, based on the new locations of placement of dots and the locations of deletion of dots determined in the rearrangement location determining process; a dot dispersion evaluation value calculating process calculating a dot dispersion evaluation value with respect to the rearranged third dot pattern; a rearrangement repetition determining process determining whether repetition of the dot pattern evaluation value calculating process, the first uniformity evaluation value calculating process, the dot rearrangement location determining process, the rearrangement pattern generating process and the dot dispersion evaluation value calculating process are performed or not, based on the dot dispersion evaluation value of the rearranged third dot pattern; and a process redefining the rearranged third dot pattern as the second dot pattern, if the repetition was determined in the rearrangement repetition determining process.

According to an invention described in claim 2, there is provided the method of generating a threshold matrix according to Claim 1, wherein the dot dispersion evaluation value is a pattern deviation value of a pattern obtained by applying a spatial frequency filter to the third dot pattern. The filter allows at least low-frequency components to pass therethrough. In the rearrangement repetition determining process, the repetition of the dot pattern evaluation value calculating process, the first uniformity evaluation value calculating process, the dot rearrangement location determining process, the rearrangement pattern generating process and the dot dispersion evaluation value calculating process is determined, if the pattern deviation obtained after the rearrangement pattern generating process is smaller than the pattern deviation obtained before the rearrangement pattern generating process.

According to an invention described in Claim 3, there is provided the method of generating a threshold matrix according to Claim 1, wherein the dot dispersion evaluation value is a noise value obtained by applying a spatial frequency filter allowing low-frequency components to pass therethrough to the third dot pattern and by integrating the output with respect to the entire frequency components in the rearrangement repetition determining process, the repetition of the dot pattern evaluation value calculating process, the first uniformity evaluation value calculating process, the dot rearrangement location determining process, the rearrangement pattern generating process and the dot dispersion evaluation value calculating process is determined, if the noise value obtained after the rearrangement pattern generating process is smaller than the noise value obtained before the rearrangement pattern generating process.

According to an invention described in Claim 4, there is provided the method of generating a threshold matrix according to any one of Claims 1 to 3, wherein size of the first discrete block varies depending on gradation value of the dot pattern.

According to an invention described in Claim 5, there is provided the method of generating a threshold matrix according to any one of Claims 1 to 4, wherein the uniformity evaluation value calculating process calculates a second uniformity evaluation value each representing uniformity of the number of dots of second discrete blocks obtained by dividing the pixel area of the predetermined size and having a size different from that of the first discrete blocks; and the dot rearrangement location determining process determines the new locations of placement of dots and the locations of deletion of dots in the process of rearrangement of dots, based on the dot pattern evaluation value, the first uniformity evaluation value and the second uniformity evaluation value.

According to an invention described in Claim 6, there is provided a threshold matrix generating device used for generating a threshold matrix used for determining a state of formation of a plurality of dots composing an output image. The threshold matrix generating device has a control unit which generates a second dot pattern obtained by increasing or decreasing the number of dots of first dot pattern having a predetermined number of dots in an pixel area of a predetermined size; obtains a third dot pattern having rearranged therein the dots contained in the second dot pattern; and repeats the process of generating the second dot pattern while redefining the third dot pattern as the first dot pattern and the process of obtaining the third dot pattern until a dot pattern having the number of dots based on a desired dot ratio is obtained. In the process of obtaining the third dot pattern, the control unit calculates a dot pattern evaluation value based on a difference between the second dot pattern and a dot pattern obtained, by subjecting the second dot pattern to a predetermined filtering aimed at implementing a desired spatial frequency in a manner corresponding to each location in the threshold matrix; calculates a uniformity evaluation value representing uniformity of the number of dots of discrete blocks obtained by dividing the pixel area of a predetermined size; determines new locations of placement of dots and locations of deletion of dots in the process of rearrangement of dots, based on the dot pattern evaluation value and the uniformity evaluation value; rearranges the dots of the third dot pattern, based on the determined new locations of placement of dots and the determined locations of deletion of dots; calculates a dot dispersion evaluation value with respect to the rearranged third dot pattern; determines whether repetition of the calculation process of the dot pattern evaluation value, the calculation process of the uniformity evaluation value, the determination process of the new locations of placement of dots and the locations of deletion of dots, the rearrangement process of the third dot pattern, and the calculation process of the dot dispersion evaluation value are performed or not, based on the dot dispersion evaluation value of the rearranged third dot pattern; and redefines the rearranged third dot pattern as the second dot pattern, if repetition was determined.

According to an invention described in Claim 7, there is provided a threshold matrix generated by summing a plurality of dot patterns, for every pixel composing each of the dot patterns. Each of the plurality of dot pattern has dots. The number of the dots corresponds to a dot ratio representing a ratio of the number of pixels having the dots formed therein relative to the total number of pixels contained in a predetermined pixel area, and corresponds to each of the dot ratios ranging from 0 to a predetermined value generated under stacking constraint conditions. When the radial average power spectrum density distribution relative to the spatial frequency of at least a dot pattern of the individual dot patterns having the dot ratio of 0.5 is fitted by a third-order polynomial in the region of a spatial frequency of 0.1 [cycles/pixel] or below, the fitted curve has an inflection point in the region, and decreases in the region of a spatial frequency of 0.05 [cycles/pixel] or below as the spatial frequency decreases.

According to an invention described in Claim 8, there is provided a quantizer which generates an output image data based on an input image data having three or a larger predetermined number of gradation. The number of gradation, of the output image data is smaller than the predetermined number. The quantizer includes: a storage unit which stores a threshold matrix; a comparator unit which compares a pixel value of the input image data and a threshold value of a threshold matrix stored in the storage unit; and an output unit which generates and outputs the output image data based on a result of comparison by the comparator unit. The threshold matrix is generated by summing a plurality of dot patterns for every pixel composing each of the dot patterns. Each of the plurality of dot pattern has dots. The number of the dots corresponds to a dot ratio representing a ratio of the number of pixels having the dots formed therein relative to the total number of pixels contained in a predetermined pixel area, and, corresponds to each of the dot ratios ranging from 0 to a predetermined value generated under stacking constraint conditions. When the radial average power spectrum density distribution relative to the spatial frequency of at least a dot pattern of the individual dot patterns having the dot ratio of 0.5 is fitted by a third-order polynomial in the region of a spatial frequency of 0.1 [cycles/pixel] or below, the fitted curve has an inflection point in the region, and decreases in the region of a spatial frequency of 0.05 [cycles/pixel] or below as the spatial frequency decreases.

According to an invention described in Claim 9, there is provided an image forming device which generates an output image data based on an input image data having three or a larger predetermined number of gradation. The number of gradation of the output image data is smaller than the predetermined number. The image forming device forms an image on a recording medium based on the output image data. The image forming device includes a quantizer and an image forming unit which forms the image on the recording medium based on the output image data output by the quantizer. The quantizer includes: a storage unit which stores a threshold matrix; a comparator unit which compares a pixel value of the input image data and a threshold value of a threshold matrix stored in the storage unit; and an output unit which generates and outputs the output image data based on a result of comparison, by the comparator unit. The threshold matrix is generated by summing a plurality of dot patterns, for every pixel composing each of the dot patterns. Each of the plurality of dot pattern has dots. The number of the dots corresponds to a dot ratio representing a ratio of the number of pixels having the dots formed therein relative to the total number of pixels contained in a predetermined pixel area, and corresponds to each of the dot ratios ranging from 0 to a predetermined value generated under stacking constraint conditions. When the radial average power spectrum density distribution relative to the spatial frequency of at least a dot pattern of the individual dot patterns having the dot ratio of 0.5 is fitted by a third-order polynomial in the region of a spatial frequency of 0.1 [cycles/pixel] or below, the fitted curve has an inflection point in the region, and decreases in the region of a spatial frequency of 0.05 [cycles/pixel] or below as the spatial frequency decreases.

Effects of the Invention

According to the present invention, the nonuniformity in density in the dithered image may be reduced in a more successful manner.

BRIEF DESCRIPTION OF THE DRAWINGS

FIG. 19A This is a concept illustration showing a result of mapping of exemplary values of matrix AVE1($a,b$) in conjunction with correlation between a matrix AVE1($a,b$) representing excess or deficiency of dots in the individual first discrete blocks and a matrix AVE2(A,B) representing excess or deficiency of dots in the individual second discrete blocks, to the individual first discrete blocks.

FIG. 19B This is a concept illustration showing a result of mapping of exemplary values of matrix AVE2(A,B), in conjunction with correlation between a matrix AVE1($a,b$) representing excess or deficiency of dots in the individual first discrete blocks and a matrix AVE2(A,B) representing excess or of dots in the individual second discrete blocks, to the individual second discrete blocks.

FIG. 29 This is a table illustrating exemplary correlation between the gradation value and the discrete block size, under a matrix size of 256×256 [pixels].

FIG. 30 This is a table illustrating exemplary correlation among the gradation value, the number of discrete blocks and the size of discrete blocks, given a matrix size of 256×256 [pixels].

FIG. 39 This is a table with values arranged therein, each value being obtained by dividing the dot pattern illustrated in FIG. 38 into discrete blocks of 32×32 [pixels], and subtracting an average number of dots from the total number of dots which appear in each discrete block.

DESCRIPTION OF THE PREFERRED EMBODIMENTS

Embodiments of the present invention will be detailed below, referring to the attached drawings.

First Embodiment

First, a first embodiment of the present invention will be explained.

Figure 1:
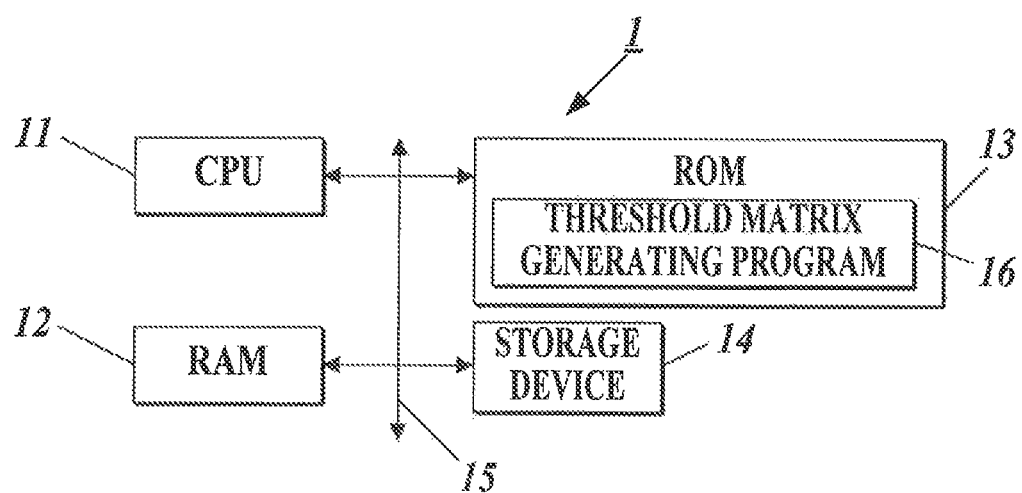
FIG. 1 This is a block diagram illustrating a configuration of a threshold matrix generating device 1 used for processing by a method of generating a threshold matrix according to a first embodiment.

FIG. 1 illustrates a configuration of a threshold matrix generating device 1 used for processing by a method of generating a threshold matrix according to the first embodiment.

The threshold matrix generating device 1 has a CPU 11, a RAM 12, a ROM 13 and a storage device 14. The CPU 11, the RAM 12, the ROM 13 and the storage device 14 are connected through a bus 15.

The CPU 11 reads a program product, data and so forth out from memory devices such as the ROM 13, the storage device 14 and so forth, and executes or subjects them to predetermined processes.

The RAM 12 is a memory device which stores the program product or data read out by the CPU 11, and temporary parameters generated by the processes executed by the CPU 11.

The ROM 13 is a memory device which stores the program product or data read out by the CPU 11, in a non-rewritable manner.

The storage device 14 is a memory device which stores the program product or data read out by the CPU 11, and data generated by the processes executed by the CPU 11, in a rewritable manner. The storage device 14 may be replaced typically by a medium rewritable a plurality of times, or only a limited number of times, and a device for writing data into the medium; or may be configured to transmit data between to or from an external memory device or medium through connection typically through a network.

The threshold matrix generating device 1 is a computer having the CPU 11, the RAM 12, the ROM 13 and so forth as described in the above, and generates a threshold matrix by so-called software processing in the first embodiment, the ROM 13 stores a threshold matrix generating program 16, and the CPU 11 reads and executes the threshold matrix generating program 16, to thereby generate the threshold matrix. Note that various data read out in the process of execution of the threshold matrix generating program 16, such as a low-pass filter and so forth described later, are stored in the ROM 13 or the storage device 14.

The process of generating the threshold matrix includes a process of generating an initial dot pattern, and a process of generating a threshold matrix based on the initial dot pattern generated by the process of generating an initial dot pattern.

Figure 2:
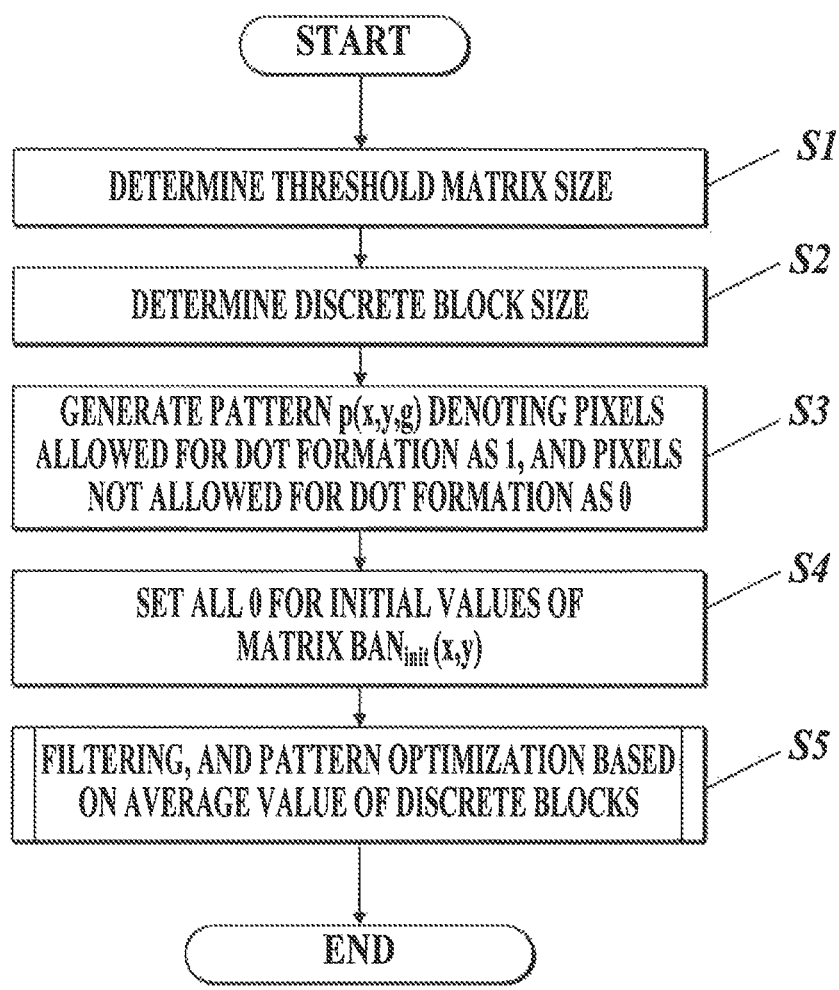
FIG. 2 This is a flow chart illustrating a flow of a process of generating an initial dot pattern.

First, a process of generating an initial dot pattern will be explained referring to the flow chart shown in FIG. 2.

First, the CPU 11 determines size of the threshold matrix (step S1). In the first embodiment, a size of 256×256 [pixels] of a square matrix, having pixels aligned in two directions orthogonal to each other (X-direction and Y-direction) 256 pixels in the X-direction and 256 pixels in the Y-direction, as a determined size of threshold matrix. The size of threshold matrix may arbitrarily be set to M×N [pixels] (M and N are natural numbers), without being limited to 256×256 [pixels]. Each of M and N are preferably 64 or larger, M and N may be the same natural number, or may be different natural numbers.

Next, the CPU 11 determines size of discrete block (step S2). In the first embodiment, 256×256 [pixels], which is the matrix size of the threshold matrix, is divided into discrete blocks of 64×64 [pixels]. The size of the discrete block is not limited, to 64×64 [pixels], and may arbitrarily be set to a size smaller than M×N [pixels] which is the size of the threshold matrix.

Figure 3:
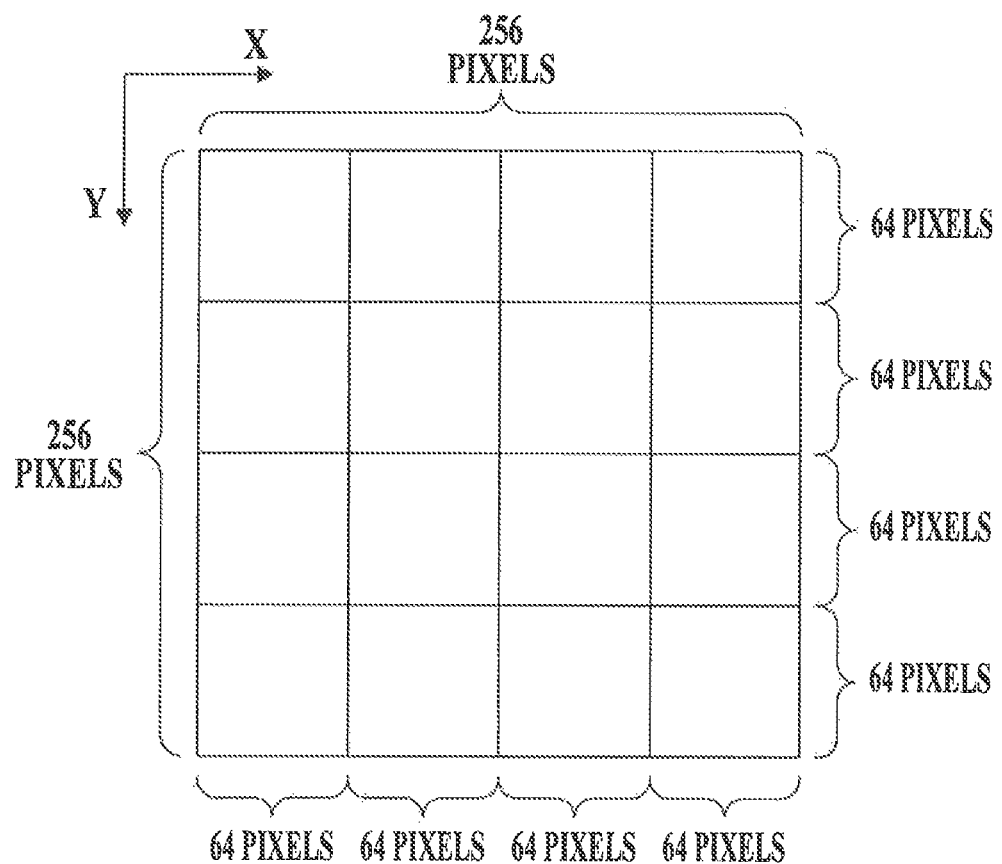
FIG. 3 This is a concept illustration showing an exemplary threshold matrix divided by discrete blocks.

FIG. 3 is a concept illustration showing an exemplary threshold matrix divided by the discrete blocks. As seen in FIG. 3, the threshold matrix of 256×256 [pixels] is divided into 16 discrete blocks (64×64 [pixels] each).

Next, the CPU 11 selects and determines pixels in the threshold matrix in which dots are formed. In the first embodiment, ratio of the number of pixels selected and determined for formation of dots, relative to the total pixels in the threshold matrix, is represented by gradation value "g". A case having all pixels in the threshold matrix selected and determined as those allowed for formation of dots is defined by a gradation value of g=1, and a case having no pixel in the threshold matrix selected and determined as those allowed for formation of dots is defined by a gradation value of g=0. For an exemplary case with a gradation value of g=0.5, a half of the pixels out of the total pixels in the threshold matrix is selected and determined as those allowed for formation of dots. In the first embodiment, the gradation value a of the initial dot pattern is set to 0.5, so that the CPU 11 selects and determines the pixels based, on a gradation value of g=0.5.

The CPU 11 then generates a matrix pattern p (x,y,g) which represents the pixels selected and determined as those allowed for formation of dots as 1, and the pixels not selected and determined as those allowed for formation of dots as 0 (step S3). p(x,y,g) represents a matrix with a gradation value of "g", wherein x represents the X-coordinate and y represents the Y-coordinate.

Next, the CPU 11 sets the initial values of matrix BANinit (x, y) to all 0 (step S4). The values of the matrix BANinit (x,y) are used as the initial values of an unswappable matrix BAN (x,y). The unswappable matrix BAN(x,y) is used in the dot arrangement converting process described later.

Next, the CPU 11 executes filtering and pattern optimization using an average value of the discrete block (step S5).

The filtering process and the pattern optimization process using an average value of the discrete block will be explained referring to the sub-flow chart shown in FIG. 4.

First, the CPU 11 sets a variable n to an initial value of 0 (step S11).

Next, the CPU 11 applies the Fourier transformation to the pattern p(x,y,g), to calculate a pattern P (u, v, g) (step S12). u and v represent frequency spaces in the X-direction and the Y-direction, respectively.

Next, the CPU 11 filters the pattern P (u,v,g) to calculate a P2($u,v,g$) (step S13). A filter used for the filtering process in step S13 is exemplified by low-pass filters such as blue noise filter, green noise filter and so forth. The blue noise filter and the green noise filter are frequency filters which allow at least low-frequency components to pass therethrough.

Figure 5:
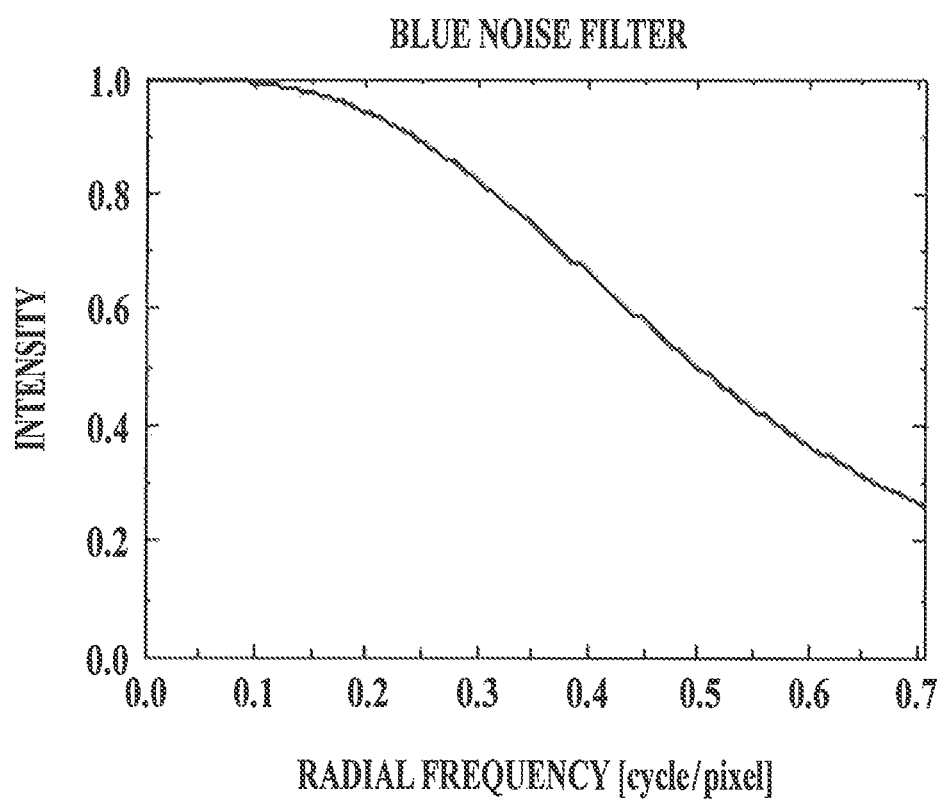
FIG. 5 This is a graph illustrating an exemplary frequency characteristic of a blue noise filter.
Figure 6:
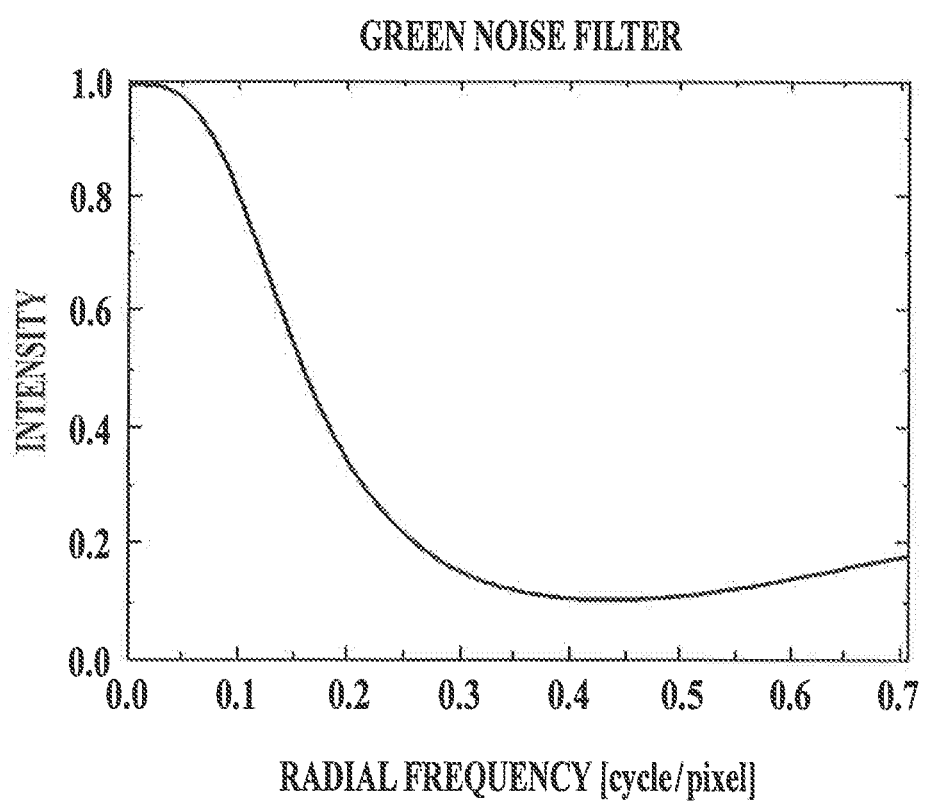
FIG. 6 This is a graph illustrating an exemplary frequency characteristic of a green noise filter.

FIG. 5 illustrates an exemplary blue noise filter, and FIG. 6 illustrates an exemplary green noise filter.

The low-pass filters such as blue noise filter, green noise filter and so forth are adoptable as isotropic filters independent of direction.

Next, the CPU 11 applies the inverse Fourier transformation to the pattern P2($u,v,g$), to thereby calculate a pattern p2($x,y,g$) (step S14).

Next, the CPU 11 calculates an error matrix ERR(x,y,g) which represents a deviation from the gradation value a, using the equation (1) below (step S15).

[Mathematical Formula 1]

$$ERR(x,y,g) = p2(x,y,g) - g \qquad (1)$$

The error matrix ERR(x,y,g) functions as a dot pattern evaluation value based on a difference between the pattern p2($x,y,g$) and a dot pattern with the gradation value g. The individual values contained in the error matrix ERR(x,y,g) correspond to the individual pixel locations of the pattern p2($x,y,g$) which is a dot pattern for generating the threshold matrix. In other words, the CPU 11 calculates the error matrix ERR(x,y,g) in a manner corresponding to the individual locations in the threshold matrix.

Next, the CPU 11 calculates an evaluation value MSE(n) (Mean Square Error) using the equation (2) below (step S16).

[Mathematical Formula 2]

$$MSE(n) = \sum_x \sum_y (ERR(x, y, g)^2) \qquad (2)$$

MSE(n) is a pattern deviation value of the pattern p2($x, y, g$), and functions as a dot dispersion evaluation value.

Next, the CPU 11 determines whether n is 0 or not (step S17). If n is not 0 (step S17: YES), the CPU 11 determines whether MSE(n) is smaller than MSE(n−1) or not (step S18).

If n is 0 in step S15 (step S17: NO) or MSE(n) is smaller than MSE(n−1) in step S16 (step S18: YES), the CPU 11 executes a dot arrangement converting process (step S19).

The dot arrangement converting process will be explained referring to a sub-flow chart shown in FIG. 7.

First, the CPU 11 sets a variable SWAPNUM, used for managing the number of pixels to be swapped, to a predetermined initial value (step S31). The predetermined initial value is an integer of 1 or larger.

Next the CPU 11 sets an unswappable matrix BAN(x, y), and copies the values of the BANinit(x,y) (step S32).

Next, the CPU 11 calculates matrix AVE (a,b) which represents uniformity of dots in each discrete block (step S33), where "a" corresponds to an integer value of quotient obtained by dividing x by the number of pixels in the X-direction of the discrete block, and "b" corresponds to an integer value of quotient obtained by dividing y by the number of pixels in the Y-direction of the discrete block.

Figure 8:
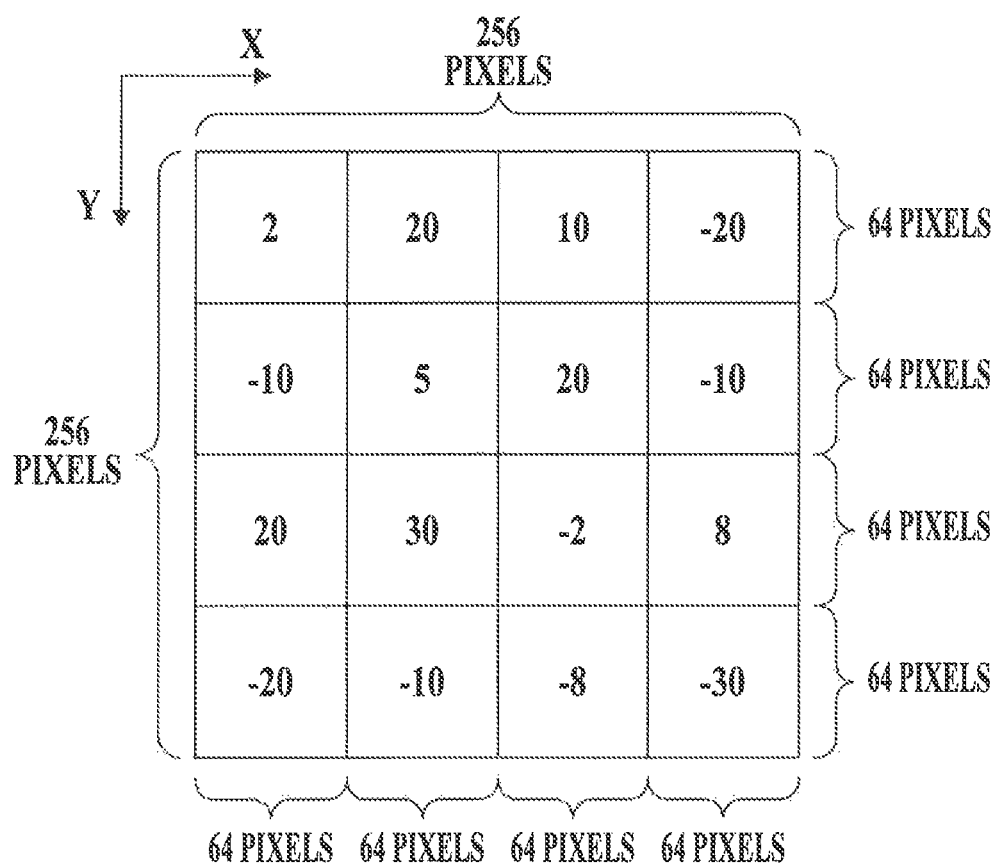
FIG. 8 This is a concept illustration showing a result obtained when exemplary values of matrix AVE(a,b) were mapped to the individual discrete blocks.

FIG. 8 is a concept illustration showing a result obtained when exemplary values of matrix AVE(a,b) were mapped to the individual discrete blocks.

The values of the matrix AVE(a,b) represent excess or deficiency of the number of dots in the individual discrete blocks, as compared with the number of dots in the individual discrete blocks estimated to generate when all discrete blocks will have a uniform number of dots.

For an exemplary case of a matrix pattern with a gradation value of g=0.5, the number of dots estimated to generate in each discrete block, assuming that all discrete blocks will have a uniform number of dots, is 2048 (64×64×0.5=2048). The values of the matrix. AVE(a,b) represent excess or deficiency of the number of dots in the individual discrete blocks, typically as illustrated in FIG. 8. In this way, the values of the matrix AVE(a,b) function as the uniformity evaluation values which represent uniformity of the number of dots in the individual discrete blocks.

Next, the CPU 11 determines whether the variable SWAPNUM exceeds 0 or not (step S34). If the variable SWAPNUM exceeds 0 (step S34: YES), the CPU 11 determines new locations of placement of dots and locations of deletion of dots.

More specifically, the CPU 11 detects coordinate (x1,y1) of a pixel which minimizes ERR(x,y,g)+αAVE(a,b), out of the pixels which satisfy p(x,y,g)=0 and BAN(x,y)=0; and detects coordinate (x2,y2) of a pixel which maximizes ERR (x, y, q)+αAVE(a,b), out of the pixels which satisfy p(x,y,q)=1 and BAN(x,y)=0 (step S35).

Now, p(x,y,g)=0 means that no dot will be formed in the pixel. On the other hand, p(x,y,g)=1 means that the dots will be formed in the pixel.

In addition, satisfaction of BAN(x,y)=0 means that the pixel is allowed for rearrangement of the dots. In contrast, satisfaction of BAN(x,y)=1 means that the pixel is not allowed for rearrangement of dots.

Minimized ERR(x,y,g) means that there is a void, having no dots formed therein, formed in and around the pixel. In contrast, maximized ERR(x,y,g) means that there is a cluster of dots, in and around the pixel. In the first embodiment, correction is made not only based on the value of ERR(x,y,g) but also by adding values obtained by multiplying the values AVE(a,b) which represent excess or deficiency of the number of dots in the individual discrete blocks, by a predetermined coefficient α (α>0). αAVE(a,b) which contains values, obtained by multiplying AVE(a,b) which contains values representing excess or deficiency of the number of dots in the individual discrete blocks, by a predetermined coefficient α (α>0), acts so as to increase ERR(x,y,g)+αAVE(a,b), when the number of dots in the discrete block exceeds the average value (AVE(a,b)>0). On the other hand, αAVE(a,b) acts so as to decrease ERR(x,y,g)+αAVE(a,b), when the number of dots in the discrete block comes short of the average value (AVE (a,b)<0).

In other words, when a pixel satisfies p(x,y,g)=0 and BAN (x,y)=0, and has a coordinate (x1,y1) where ERR(x,y,g)+ αAVE(a,b) is minimized, it is understood that no dot will be formed in the pixel, that the pixel is allowed for rearrangement of dots, and that there is a void, having no dot formed therein, formed in and around the pixel. Since ERR(x,y,g)+ αAVE(a,b) is minimized, so that the number of dots in the discrete block containing the pixel is likely to come short of the average value. On the other hand, when a pixel satisfies p(x,y,g)=1 and BAN(x,y)=0, and has a coordinate (x2,y2) where ERR(x,y,g)+αAVE(a,b) is maximized, it is understood that the dots are formed in the pixel, that the pixel is allowed for rearrangement of dots, and that there is a cluster of dots in and around the pixel. Since ERR(x,y,g)+αAVE(a,b) is maximized, so that the number of dots in the discrete block containing the pixel is likely to exceed the average value.

By the evaluation using ERR(x,v,g)+αAVE(a,b) as described in the above, the pixel allowed for rearrangement of dots may be determined, based on evaluation taking both of local uniformity of dot arrangement and overall uniformity of dot arrangement over a mask into account.

The CPU 11 then swaps arrangement of dots in the thus-identified pixel (x1,y1) and pixel (x2,y2), by defining p(x1,y1,g)=1 and p(x2,y2,g)=0 (step S36). More specifically, the dots will be placed in the pixel (x1,y1) which has no dots formed therein before the rearrangement, but is allowed for rearrangement of dots, and has the void having no dot formed therein in and around the pixel; and the dots will be deleted from the pixel (x2, y2) which has dots formed therein before the rearrangement, and is allowed for rearrangement of dots, and has the cluster of dots in and around the pixel.

After completion of the process in step S36, the CPU 11 modifies the values of AVE(a,b) in the discrete block which, contains pixel where the dots were rearranged. More specifically, the CPU 11 adds 1 to the values of AVE(c,d) which represent excess or deficiency of the number of dots of the discrete block containing the pixel (x1,y1), and subtracts 1 from the values of AVE(e,f) which represent excess or deficiency of the number of dots of the discrete block containing, the pixel (x2,y2) (step S37). In this process, c and e may be determined by integer values of quotients obtained by dividing x1 and x2 by the number of pixels (64, for example) in the X-direction of the discrete block, and, d and f may be determined by integer values of quotients obtained by dividing y1 and y2 by the number of pixels (64, for example) in the Y-direction of the discrete block.

Next, the CPU 11 bans further rearrangement in the pixel having dots already rearranged therein. More specifically, the CPU 11 sets the values of the BAN(x1,y1) and BAN(x2,y2) to 1 (step S38).

Next, the CPU 11 subtracts 1 from the variable SWAPNUM (step S39). After step S39, the CPU returns back to the determination process in step S34.

In step S34, if the variable SWAPNUM does not exceed 0 (step S34: NO), the CPU 11 terminates the dot arrangement converting process illustrated by step S19 in FIG. 4 and the sub-flow chart in FIG. 7.

In other words, in the dot arrangement converting process, the CPU 11 swaps arrangement of dots between a pixel having no dot formed therein, allowed for rearrangement of dots, and has the void having no dot formed therein in and around the pixel; and a pixel having dots formed therein before the rearrangement, allowed for rearrangement of dots, and has the cluster of dots in and around the pixel, number of times specified by the initial value of the variable SWAPNUM. Determination of the dots to be swapped is associated with correction based on the excess and deficiency of the number of dots in the individual discrete blocks. The dots already rearranged are banned to be further rearranged.

Figure 4:
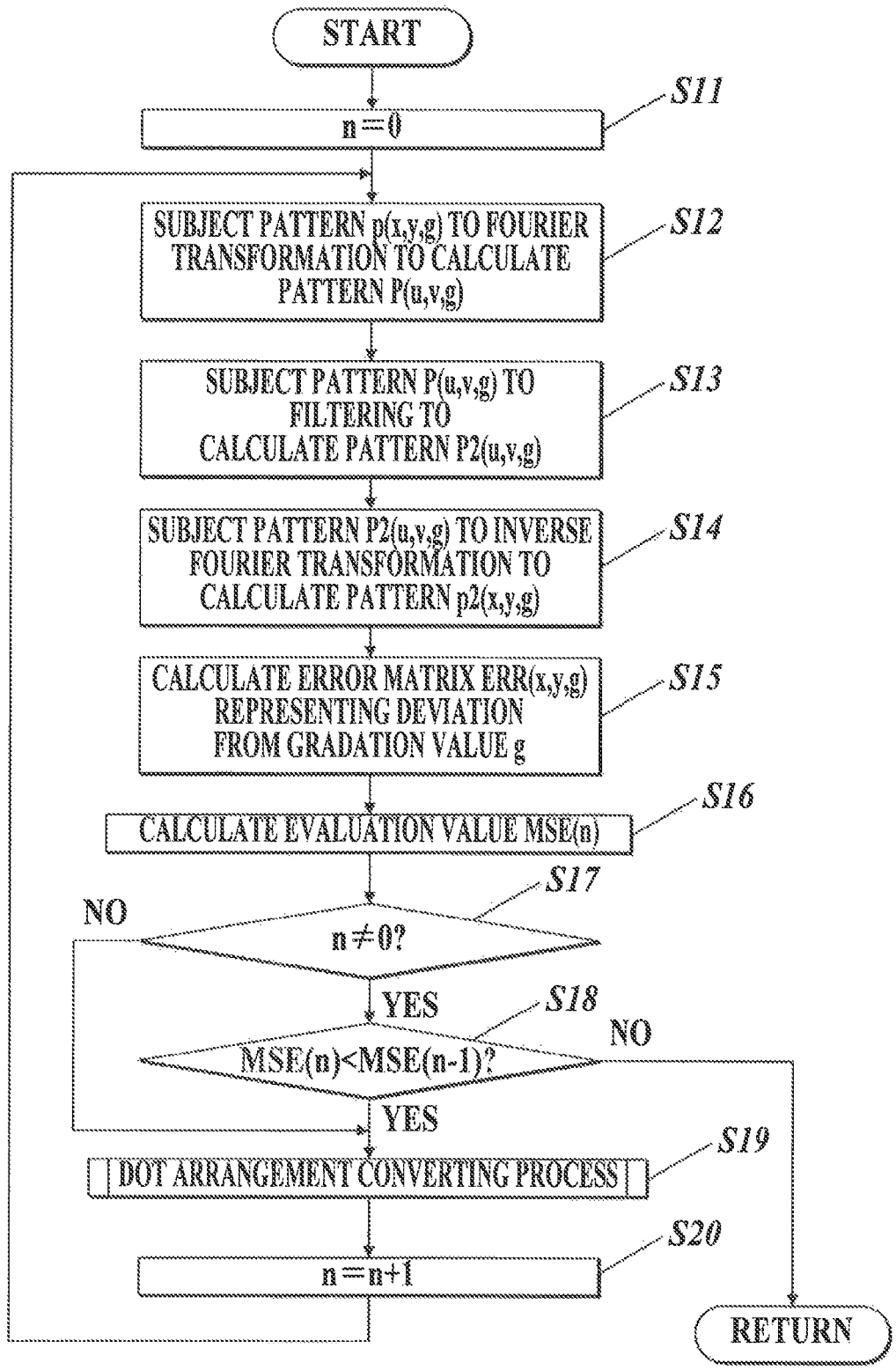
FIG. 4 This is a sub-flow chart illustrating a flow of filtering and pattern optimization based on an average value of the discrete blocks.
Figure 7:
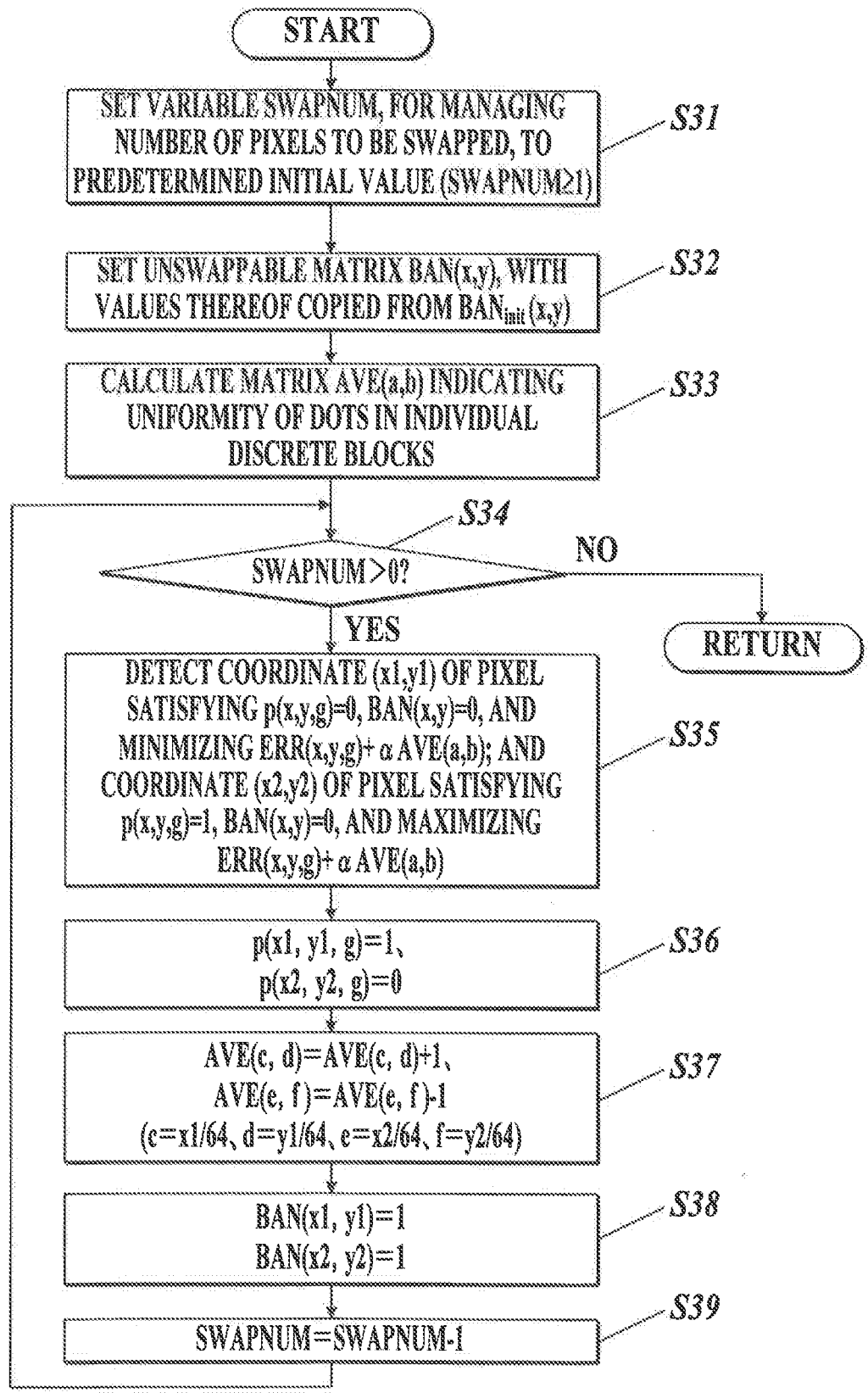
FIG. 7 This is a sub-flow chart illustrating a flow of a dot arrangement converting process.

After completion of the sub-flow illustrated in FIG. 7, and the dot arrangement converting process in step S19 in the sub-flow it in FIG. 4, the CPU 11 adds 1 to variable n (step S20). The CPU 11 is then returns back to the process in step 12.

By returning back to step S12 after completion of the process in step S20, the matrix pattern after the dot arrangement converting process is subjected to the Fourier conversion in step S12, the filtering process in step S13, the inverse Fourier transformation in step S14, calculation of the error matrix in step 315, and calculation of MSE in step S16. If the dot arrangement converting process is executed once or more number of times, the variable n will be 1 or larger. This corresponds to the case where n is not 0 in the determination process in step S17 (step S17: YES), and the process advances to step S18, where whether MSE(n) is smaller than MSE(n−1) or not is determined. Since the initial value of n is 0, so that the dot arrangement converting process takes place at least once.

So long as MSE(n) is found to be smaller than MSE(n−1) in step S18, the processes succeeding step S12 are repeated (step S18: YES).

In step S18, if MSE(n) is found to be not smaller than MSE(n−1) (step S18: NO), the CPU 11 terminates the filtering process and pattern optimization process based on the average value of the discrete blocks in step S5 in FIG. 3, and in sub-flow illustrated in FIG. 4, and terminates the generation process of the initial dot pattern illustrated in FIG. 3. The initial dot pattern is generated as pinit(x,y), and stored in the storage device 14.

Next, a process of generating a threshold matrix using the initial dot pattern generated in the process of generating an initial dot pattern will be explained.

The process of generating a threshold matrix is proceeded under the stacking constraint conditions. More specifically, the dots are increased or decreased corresponding to the amount of change δg in gradation value, based on the gradation value g of the initial dot pattern. In this process, if the gradation value increases by the contribution of the amount of change δg in gradation value, the dot arrangement found in the original initial dot pattern will not be changed. In other words, the dots are increased by adding new dots while keeping the original initial dot pattern unchanged. On the other hand, for the case where the gradation value decreases by the contribution of the amount of change δg in gradation value, the arrangement of pixels having no dots formed therein, found in the original initial dot pattern, will not be changed. In other words, the dots are decreased by deleting the dots so as to increase the number of pixels having no dots formed therein, while keeping the pixels having no dots formed therein unchanged. In this way, the threshold matrix generating device 1 generates the individual dot patterns composed of 256×256 [pixels] corresponding to the individual dot ratios.

When a dot pattern, having the gradation value g+δg as a result of increase or decrease of dots corresponding to the amount of change δg in gradation value, to or from the gradation value g of the initial dot pattern, is generated, and when the dots in the dot pattern having the gradation value g+δg are further increased or decreased corresponding to the amount of change δg in gradation value, the process is now proceeded by redefining the latest dot pattern having the gradation value g+δg as the initial dot pattern.

For example, if the amount of change in gradation value is given as δg=0.01, a dot pattern with a gradation value of g+δg=0.51, and a dot pattern with a gradation value of g−δg=0.49 are generated from a dot pattern with a gradation value of g=0.5. In the next process, the dot pattern with a gradation value of 0.51 and the dot pattern with a gradation value of 0.49 are redefined as the initial dot patterns, and the dot patterns with a gradation value of 0.52 and a gradation value of 0.48 are generated. Similar processes are repeated thereafter so as to generate the dot patterns corresponding to the individual gradation values, and thereby the threshold matrix is generated.

The threshold matrix is generated as matrix Th(x,y), and stored in the storage device 14.

Figure 9A:
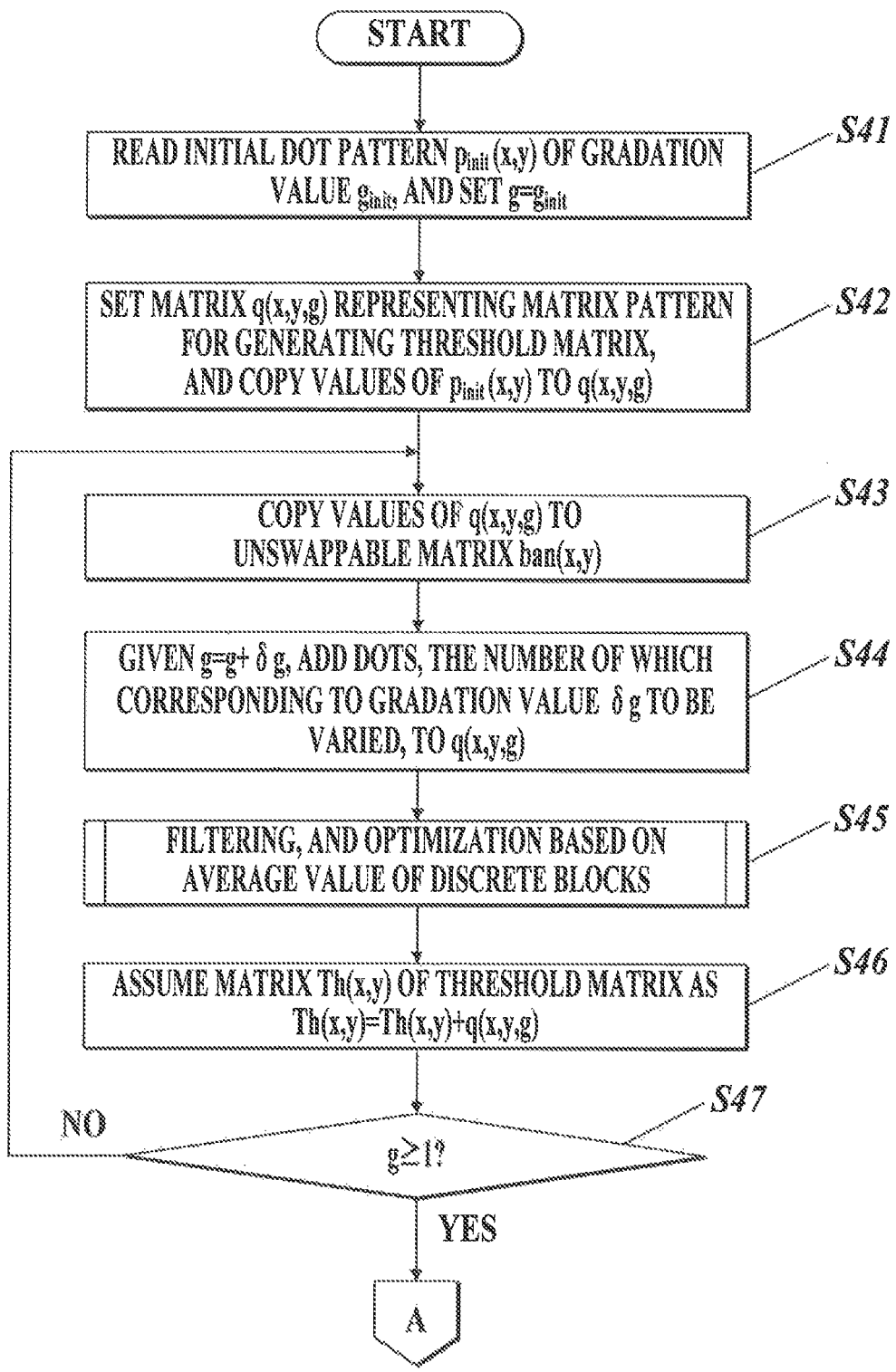
FIG. 9A This is a flow chart illustrating a flow of a process of generating a threshold matrix, based on an initial dot pattern generated by the process of generating an initial dot pattern.
Figure 9B:
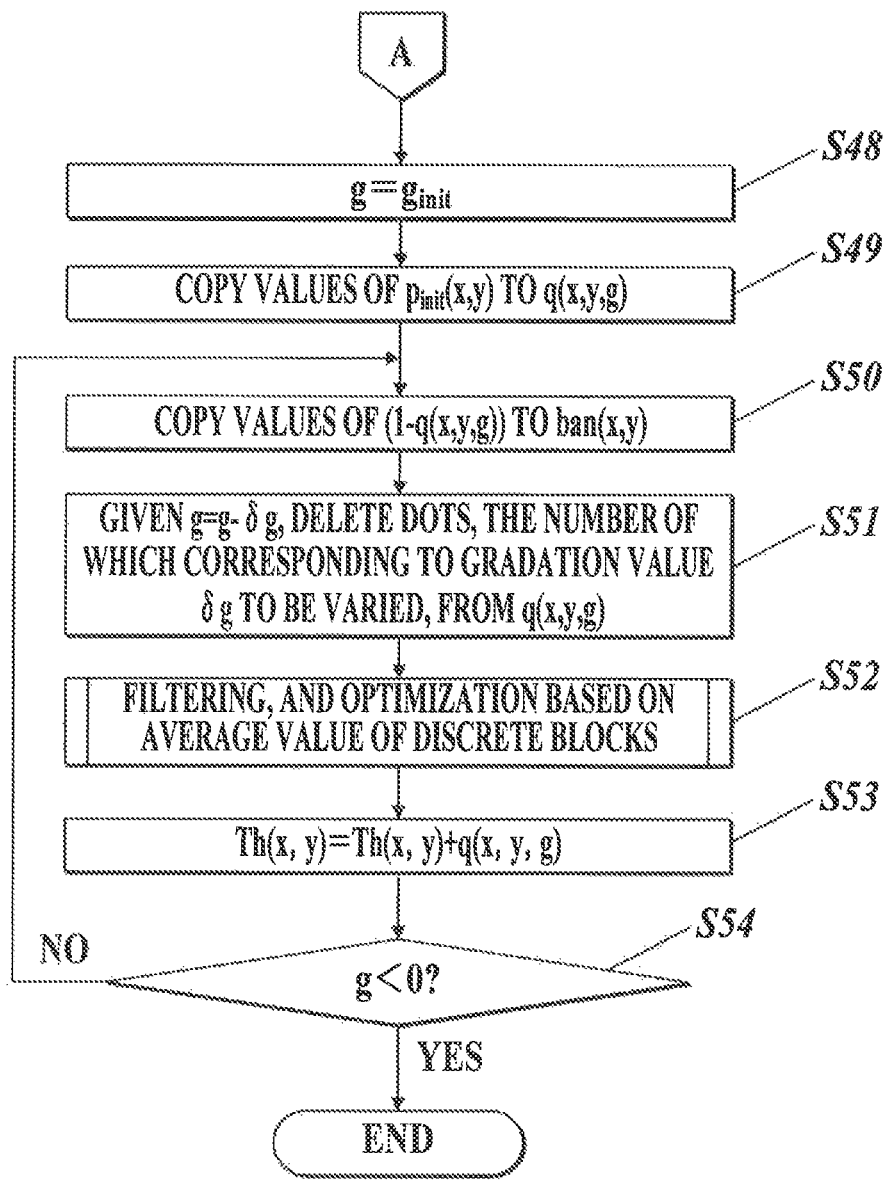
FIG. 9B This is a flow chart illustrating a flow of a process of generating a threshold matrix, based on an initial dot pattern generated by the process of generating an initial dot pattern.

A process of generating a threshold matrix using the initial dot pattern generated in the process of generating an initial dot pattern will be explained below, referring to the flow chart in FIG. 9.

First, the CPU 11 reads out the initial dot pattern pinit(x,y) (step S41). The initial dot pattern pinit(x,y) in the first embodiment has a gradation value ginit of 0.5. Now, the initial value of the gradation value g used thereafter will be referred to as ginit.

While the initial dot pattern pinit(x,y) in the first embodiment has a gradation value ginit of 0.5, it may be an arbitrary value from 0 to 1. In the process of generating the initial dot pattern, an initial dot pattern with the gradation value g arbitrarily selectable from 0 to 1 may be generated, and may be used for the process of generating a threshold matrix.

Next, the CPU 11 sets a matrix q(x,y,g) which represents a matrix pattern for generating the threshold matrix, and copies the values of the initial dot pattern pinit(x,y) to q(x,y,g) (step S42).

Next, the CPU 11 sets an unswappable matrix ban(x,y), and copies the values of q(x,y,g) to ban(x,y) (step S43). The values of the unswappable matrix ban now function similarly to the unswappable matrix BAN. In other words, if ban(x,y)=1, it indicates that the dots are not allowed for rearrangement. Since the unswappable matrix ban(x,y) has the values copied from q(x,y,g), so that the values of the unswappable matrix ban(x,y) corresponding to the pixels allowed for formation of dots (with a value of 1) will be set to 1. The pixels of the initial dot pattern having the dots already formed therein are banned for rearrangement of dots, so that the dots will not be deleted from the pixels.

Next, the CPU 11 adds the amount of change δg in gradation value to be varied to the gradation value g, and adds dots, the number of which corresponds to the amount of change gradation value to be varied, to q(x,y,g) (step S44). The dot pattern added with the dots is stored as new cq(x,y,g), in the RAM 12 or the storage device 14. The dots are added to the locations in q(x,y,g) selected from all locations having no dot formed therein, according to a predetermined random number process.

Next, the CPU 11 executes filtering and pattern optimization based on the average value of the discrete blocks (step S45). The filtering process and the pattern optimization process based on the average value of the discrete blocks in step S45 are same as the process of generating an initial dot pattern in step S5, except that the pattern p(x,y,g) and the unswappable matrix BAN(x,y), found in FIG. 4 and the sub-flow in FIG. 5, are replaced with q(x,y,g) and the unswappable matrix ban(x,y), respectively.

More specifically, the CPU 11 subjects the pattern q(x,y,g) to various processes including the Fourier transformation in step S12, the filtering process in step S13, the inverse Fourier transformation in step S14, the calculation process of the error matrix ERR(x,y,g) which functions as the dot pattern evaluation value in step S15, the calculation process of the MSE which functions as a dot dispersion evaluation value in step S16, and the dot arrangement converting process illustrated in FIG. 7.

In the dot arrangement converting process, the CPU 11 executes various processes including the calculation process of the matrix AVE(a,b) which functions as the evaluation values indicating excess or deficiency of dots, or uniformity, of the individual discrete blocks in step S33, the determination process of the new locations of placement of dots and locations of deletion of dots using the error matrix ERR(x,y,g) and the matrix AVE(a,b) in step S35, and the formation process of a new dot pattern by converting the dot arrangement in step S36.

Then, in step S18, the CPU 11 repeats the filtering process including the dot arrangement converting process, and the pattern optimization process based on the average value of the discrete blocks, so long as the dot dispersion evaluation value satisfies a predetermined condition, that is, so long as MSE (n) is smaller than MSE(n−1).

After the filtering process and the pattern optimization based on the average value of the discrete blocks in step S45, the CPU 11 adds optimized q(x,v,g) to the matrix Th(x,y) which represents a threshold matrix (step S46).

Next, the CPU 11 determines whether g is 1 or larger or not (step S47). If g is smaller than 1 (step S47: NO), the CPU 11 returns back to the process in step S43.

If g is determined as 1 or larger in step S47 (step S47:YES), the CPU 11 substitutes the gradation value ginit of the initial dot pattern pinit(x,y) for the gradation value q (step S48).

Next, the CPU 11 copies the values of the initial dot pattern pinit(x,y) to the pattern q(x,y,g) (step S49).

Next, the CPU 11 copies the values of (1−q(x,y,g)) to the unswappable matrix ban(x,y) (step S50). Since the unswappable matrix ban(x,y) has the values of (1−q(x,y,g)) copied thereto, so that the values of the unswappable matrix ban(x,y) corresponding to the pixels having no dot formed therein (with a value of 0) will be set to 1. The pixels of the initial dot pattern having no dot formed therein are banned for rearrangement of dots, so that the pixels will not have new dot arranged thereto.

Next, the CPU 11 subtracts the amount of change δq in gradation value, from the gradation value g, and deletes the dots, the number of which corresponds to the amount of change δg in gradation value to be varied, from q(x,y,g) (step S51). The dot pattern having the dots deleted therefrom is stored as new q(x,y,g), in the RAM 12 or the storage device 14. The dots are deleted from the locations in q(x,y,g) selected from all locations having dots formed therein, according to a predetermined random number process.

Next, the CPU 11 executes the filtering process and the pattern optimization process based on the average value of the discrete blocks (step S52). The filtering process and the pattern optimization process based on the average value of the discrete blocks in step S52 are similar to those in step S45.

After the filtering process and the pattern optimization process based on the average value of the discrete blocks in step S52, the CPU 11 adds optimized q(x,y,g) to the threshold matrix Th(x,y) (step S53).

Next, the CPU 11 determines whether g is smaller than 0 or not (step S54). If g is not smaller than 0 (step S54 NO), the CPU 11 returns back to the process of step S50.

It g is determined to be smaller than 0 in step S54 (step S94: YES), the CPU 11 terminates the process of generating a threshold matrix using the initial dot pattern generated by the process of generating an initial dot pattern.

The addition process of dots in step S44 and the deletion process of dots in step S51 may be executed based on any other method other than the random number process. The other method is exemplified by a method based on error diffusion. In this process, the more the distribution of dots in the dot pattern after the addition or deletion process resembles to a desired pattern, the earlier the cycle of the filtering process, the pattern optimization process based on the average value of the discrete blocks, and the dot arrangement converting process may be finished.

As has been described in the above, the threshold matrix generating process of the first embodiment includes:

new dot pattern generating processes (step S44, step S51) generating, in an image of a predetermined size based on a first dot pattern (initial dot pattern) having a predetermined number of dots, a second dot pattern (q(x,v,g)) obtained by increasing or decreasing the number of dots of the first dot pattern;

rearrangement processes (step S45, step S52) obtaining a third dot pattern having rearranged therein the dots contained in the second dot pattern; and repetition processes (steps S43 to S47, steps S50 to S54) repeating the new dot pattern generating processes and the rearrangement processes until a dot pattern, having the number of dots based on a desired dot ratio, is obtained while redefining the third dot pattern as the first dot pattern;

the rearrangement processes further include dot pattern evaluation value calculating processes (steps S12 to S15) calculating the error matrix ERR(x,y,g) functioning as the dot pattern evaluation value, which is based on a difference between the second dot pattern, and a dot pattern obtained by subjecting the second dot pattern to a predetermined filtering aimed at implementing a desired spatial frequency, in a manner corresponding to each location in the threshold matrix;

a first uniformity evaluation value calculating process (step S33) calculating, for a plurality of discrete blocks (first discrete blocks) obtained by dividing the pixel area of a predetermined size, the matrix AVE(a,b) which functions as the first uniformity evaluation value which represents uniformity of the number of dots of the individual first discrete blocks;

a dot rearrangement location determining process (step 335) determining new locations of placement of dots and locations of deletion of dots in the process of rearrangement of dots, based on the dot pattern evaluation value and the first uniformity evaluation value;

a rearrangement pattern generating process (step S36) rearranging the dots of the third dot pattern, based on the new locations of placement of dots and the locations of deletion of dots determined in the rearrangement location determining process;

a dot dispersion evaluation value calculating process (step S16) calculating MSE(n) which functions as the dot dispersion evaluation value with respect to the rearranged third dot pattern;

a rearrangement repetition determining process (step S18) determining whether the dot pattern evaluation value calculating process, the first uniformity evaluation value calculating process, the dot rearrangement location determining process, the rearrangement pattern generating process and the dot dispersion evaluation value calculating process are repeated or not, based on the dot dispersion evaluation value of the rearranged third dot pattern; and a process (step S12 after steps S19, S20) redefining the rearranged third dot pattern as the second dot pattern (q(x,y,g)), if repetition was determined in the rearrangement repetition determining process.

In the first embodiment, a desired spatial frequency distribution of the dot pattern may be implemented by removing frequency component $P2(u,v,g)$ which is obtained by subjecting the input dot pattern p(x,v,g) to the Fourier transformation (step S12), and then by subjecting the resultant P(u,v,g) to spatial filtering (step S13).

The process of removing $P2(u,v,g)$ herein is implemented by determining the pattern $p2(x,y,g)$ by the inverse Fourier transformation (step S14), determining a difference between the resultant and the gradation value g as the ERR(x, y, g) (step S15) and removing the variation thereof in the dot arrangement converting process (step S19).

Assuming now that "the desired pattern" as "a pattern having the low-frequency components removed therefrom", the calculation process of error, aimed at implementing a dot pattern corresponding to a desired spatial frequency distribution, is proceeded by the filtering process for extracting unnecessary low-frequency components from the input pattern p(x,y,g) (step S12 to S14), and the calculation process of error matrix ERR(x,y,g) for removing the thus-extracted unnecessary low-frequency components (step S15).

Figure 10:
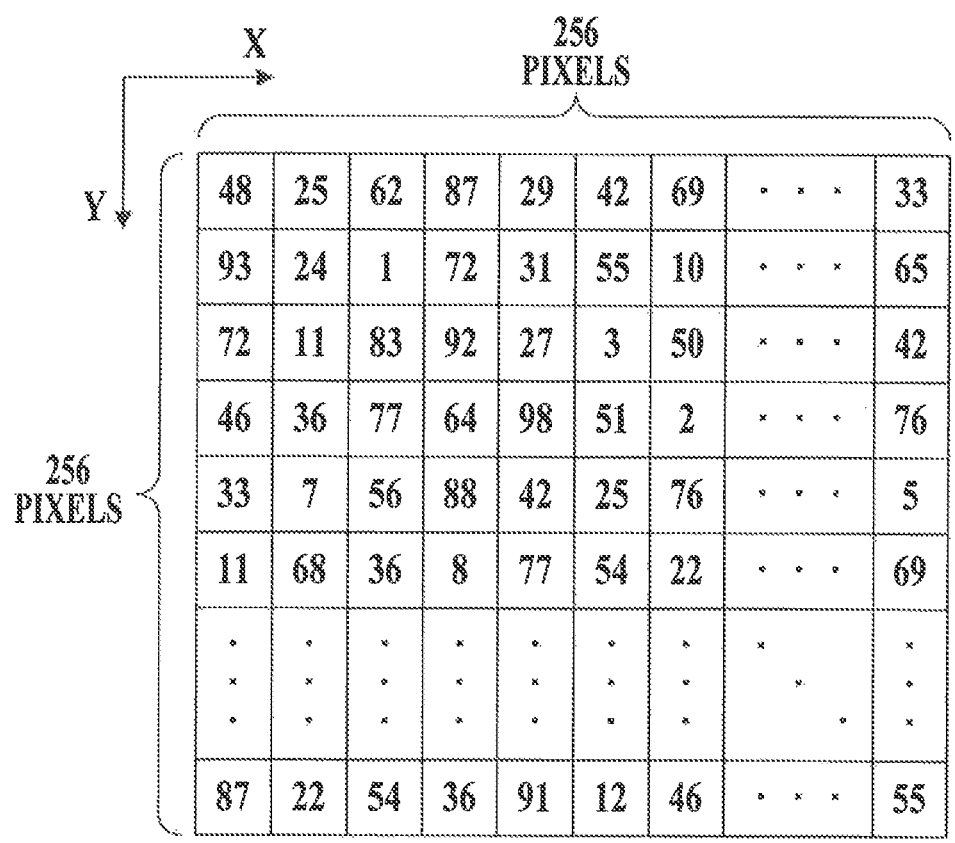
FIG. 10 This is a drawing illustrating an example of a part of a threshold matrix Th(x,y).
Figure 11:
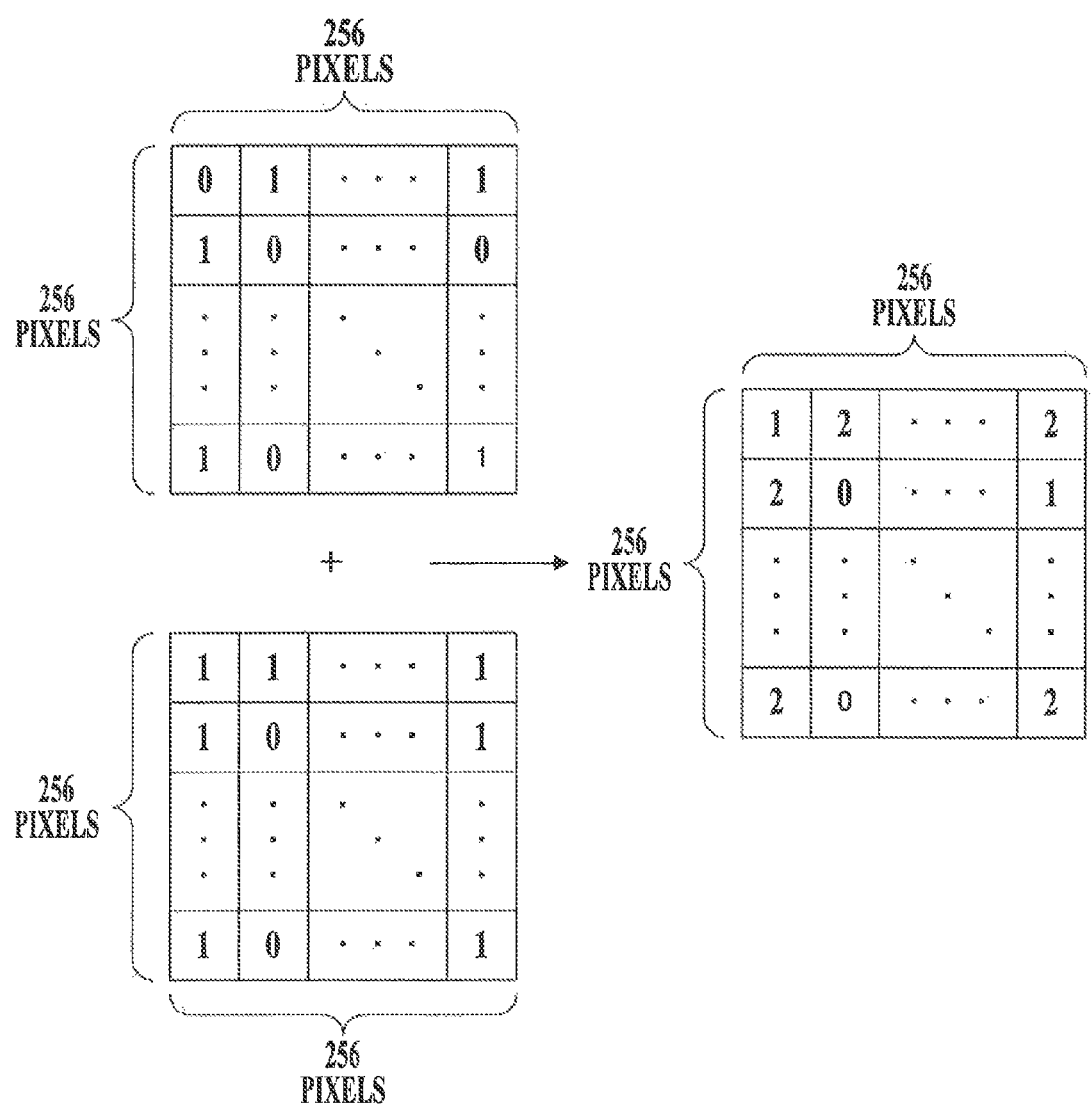
FIG. 11 This is an explanatory drawing illustrating a generation mechanism of a threshold matrix by adding 0 or 1, corresponding to dot patterns with the individual gradation values.

FIG. 10 illustrates a part of an exemplary threshold matrix Th(x,y). FIG. 11 illustrates a generation mechanism of a threshold matrix by adding 0 or 1, corresponding to dot patterns with the individual gradation values.

The threshold matrix Th(x,y) of the first embodiment is generated as a matrix having a size of 256×256 [pixels], and has the threshold values of the individual pixels set therein as the values of the threshold matrix Th(x,y). Each of the values of the threshold matrix Th(x,y), set as a value of each pixel, is determined by addition of 0 or 1 according to the dot pattern with each gradation value.

As illustrated in FIG. 11, by addition of matrices representing dot patterns with two certain gradation values, the pixel with a value of "1", which indicates formation of dot, in both of two matrices will have a value of "2" as a result of addition. Similarly, the pixel with a value of "1" in only one of two matrices will have a value of "1". On the other hand, the pixel with a value of "0" in both of two matrices will have a value of "0" even after the addition. As is understood from the above, the pixel allowed for formation of dots under a larger number of gradation values will have a relatively larger threshold value as a result of addition, and conversely, the pixel not allowed for formation of dots under a larger number of gradation values will have a relatively smaller threshold value. The threshold values corresponding to the individual pixels of the threshold matrix Th(x,y) are obtained by inverting the matrix values determined by adding 0 or 1 corresponding to the dot pattern of the individual gradation values, as described in the above.

In short, the threshold matrix may be generated by adding the individual dot patterns respectively composed of M×N pixels (256×256 [pixels] in this embodiment, for example) with the individual dot ratios generated under the stacking constraint conditions in a pixel-by-pixel manner, wherein the pixel being a constituent of the individual patterns, followed by inversion.

The first embodiment herein deals with the case where the amount of change δg in gradation value is set to 0.01. The matrix pattern has a size of 256×256=65536 [pixels], and the number of pixels allowed for formation of dots will be 0 [pixels] if the gradation value is 0, and will be 65536 [pixels] if the gradation value is 1. Accordingly, difference of the number of dots between every adjacent gradation values under an increment of the amount of change δq in gradation value of 0.01 will be 655.36 [pixels] on the average. Since the number of pixels has to be an integer, so that the difference in the number of dots between every adjacent gradation values will be given as 655 [pixels] or 656 [pixels]. Which of 655 [pixels] or 656 [pixels] is to be selected may arbitrarily be determined, so long as the number of pixels allowed for formation of dots under a gradation value of 0 will be given as 0 [pixels], and so long as the number of pixels allowed for formation of dots under a gradation value of 1 will be given as 65536 [pixels]. Any processes different from those of the first embodiment, in the range of the gradation value g, the amount of change δg in gradation value, and size of matrix pattern, may conform to similar procedures.

Figure 12:
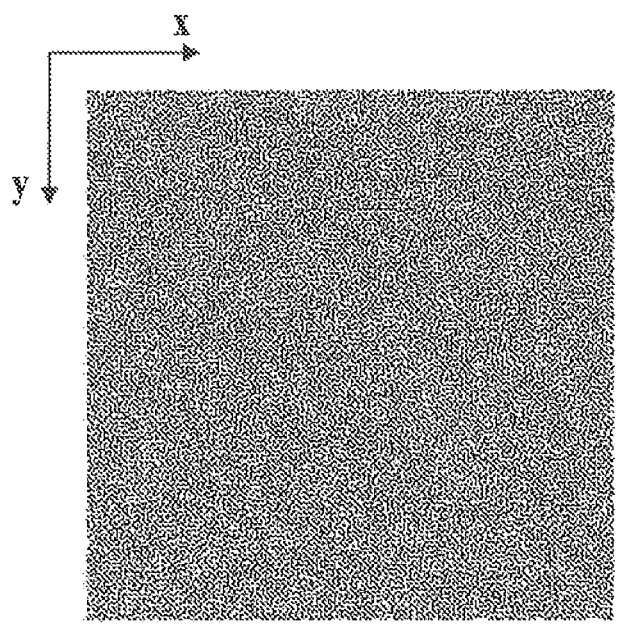
FIG. 12 This is a drawing illustrating an exemplary dot pattern with a dot ratio of 50%, obtained by the method of generating a threshold matrix according to the first embodiment.
Figure 13:
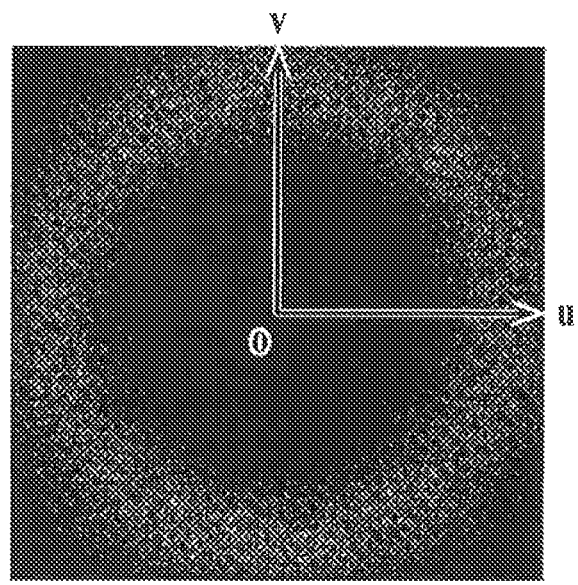
FIG. 13 This is a drawing illustrating a two-dimensional spatial frequency of the dot pattern illustrated in FIG. 12.

FIG. 12 illustrates an exemplary dot pattern with a dot ratio of 50%, obtained by the method of generating a threshold matrix according to the first embodiment. FIG. 13 illustrates a two-dimensional spatial frequency of the dot pattern illustrated in FIG. 12. The center "o" of FIG. 13 corresponds to DC components, the u-direction corresponds to frequency components in the x-direction in FIG. 12, and the v-direction corresponds to frequency components in the y-direction in FIG. 12, FIG. 14 is a graph illustrating RAPSD corresponding to the dot pattern illustrated in FIG. 12, FIG. 15 is a partial enlarged drawing of low-frequency components in the graph illustrated in FIG. 14.

Figure 14:
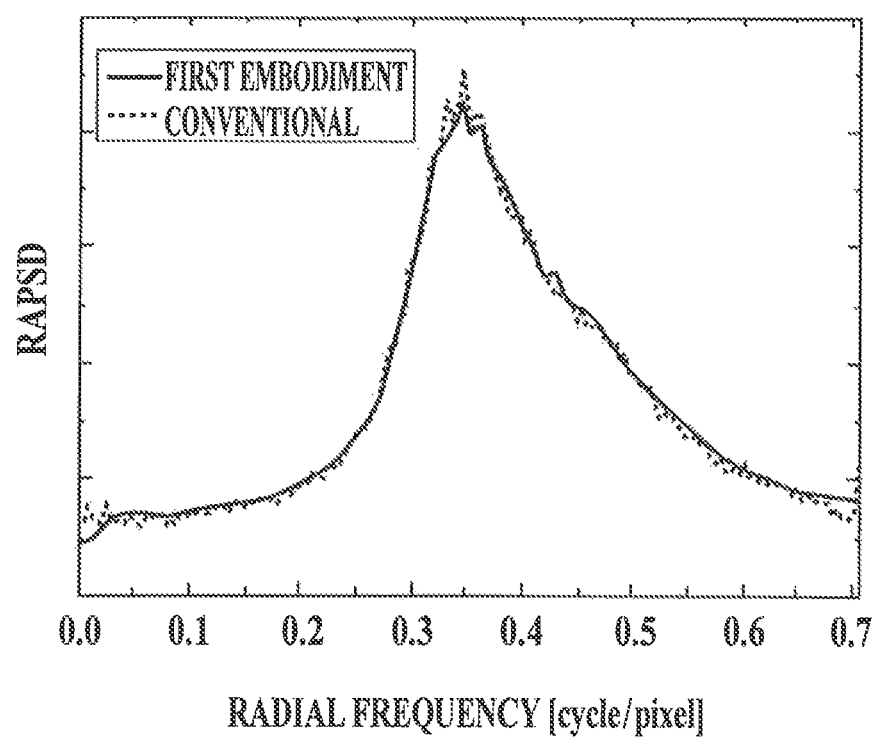
FIG. 14 This is a graph illustrating RAPSD corresponding to the dot pattern illustrated in FIG. 12.
Figure 15:
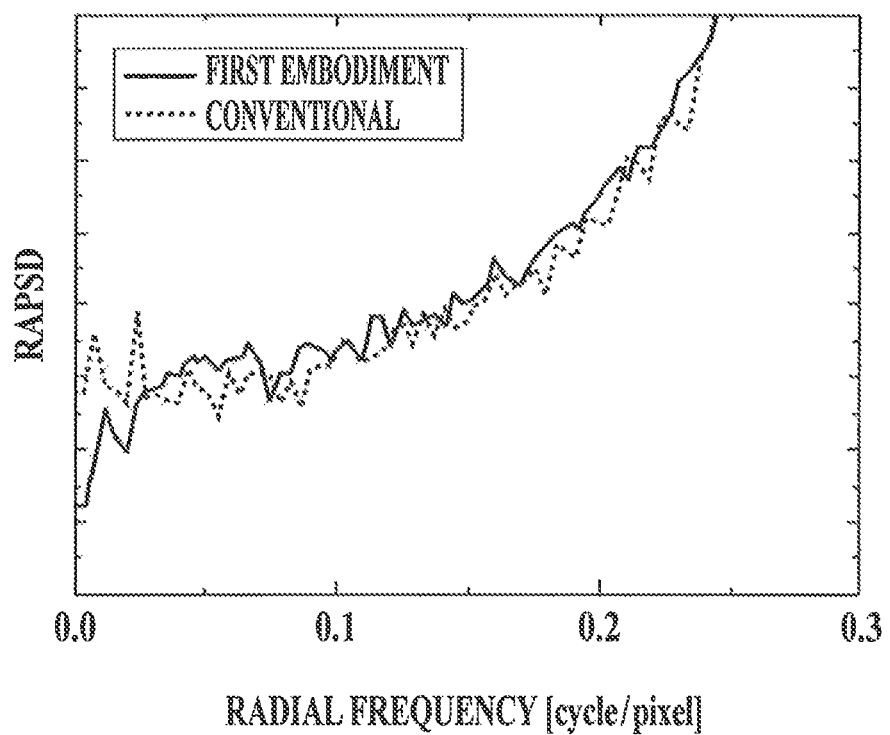
FIG. 15 This is a partial enlarged drawing of low-frequency components in the graph illustrated in FIG. 14.

As seen in FIG. 14 and FIG. 15, the dot pattern using the threshold matrix generated by the method of generating a threshold matrix according to the first embodiment is successfully suppressed in the low-frequency components, as compared with that generated by the conventional method. This indicates that the uniformity of distribution of dots in the dot pattern is improved, and that nonuniformity in density in the dithered image may be reduced in a more successful manner as a consequence. In short, the method of generating a threshold matrix according to the first embodiment can provide a threshold matrix capable of successfully reducing the nonuniformity in density in the dithered image.

As described in the above, according to the first embodiment, since the dot arrangement is swapped by determining two pixels, allowed for swapping of dot arrangement in between, based on the evaluation values in the form of the error matrix ERR(x,y,g) and the correction values in the form of the matrix AVE(a,b) which represent uniformity of the number of dots in the individual discrete blocks, so that the dot pattern generated herein may have a more uniform arrangement of dots, as compared with the dot pattern obtained by swapping of the dot arrangement simply based on the evaluation values in the form of the matrix ERR(x,y,g) only. Accordingly, the threshold matrix Th(x,y) according to the dot patterns having uniform dot arrangement under the individual gradation values may be generated. Since the dithering process using the threshold matrix Th(x,y) gives uniform dot arrangement under any arbitrary gradation value g, so that nonuniformity in density in the dithered image may be reduced in a successful manner. This sort of averaging of uniformity of the number of dots in the discrete blocks cannot be implemented by the space filter method using an isotropic spatial filter. This is because the process per se of averaging the uniformity of the number of dots in the discrete blocks means control of an anisotropic spatial frequency distribution.

Second Embodiment

Next, a second embodiment of the present invention will be explained. Note that all constituents similar to those in the first embodiment will be given the same reference numerals, so as to avoid repetitive explanation.

According to the method of generating a threshold matrix of the second embodiment, in the process of calculating the uniformity evaluation values calculated by dividing the matrix pattern of a predetermined size into a plurality of discrete blocks, the uniformity evaluation values are calculated respectively for two different sizes of the discrete block. One of the uniformity evaluation values for two different sizes of the discrete block will be referred to as a first uniformity evaluation value, and the other as a second uniformity evaluation value.

The description of the second embodiment below deals with a case of using a matrix pattern having a size of 256×256 [pixels] similarly as described in the first embodiment. A discrete block (first discrete block) relevant to the first uniformity evaluation value has a size of 64×64 [pixels] and a discrete block (second discrete block) relevant to the second uniformity evaluation value has a size of 32×32 [pixels].

Figure 16:
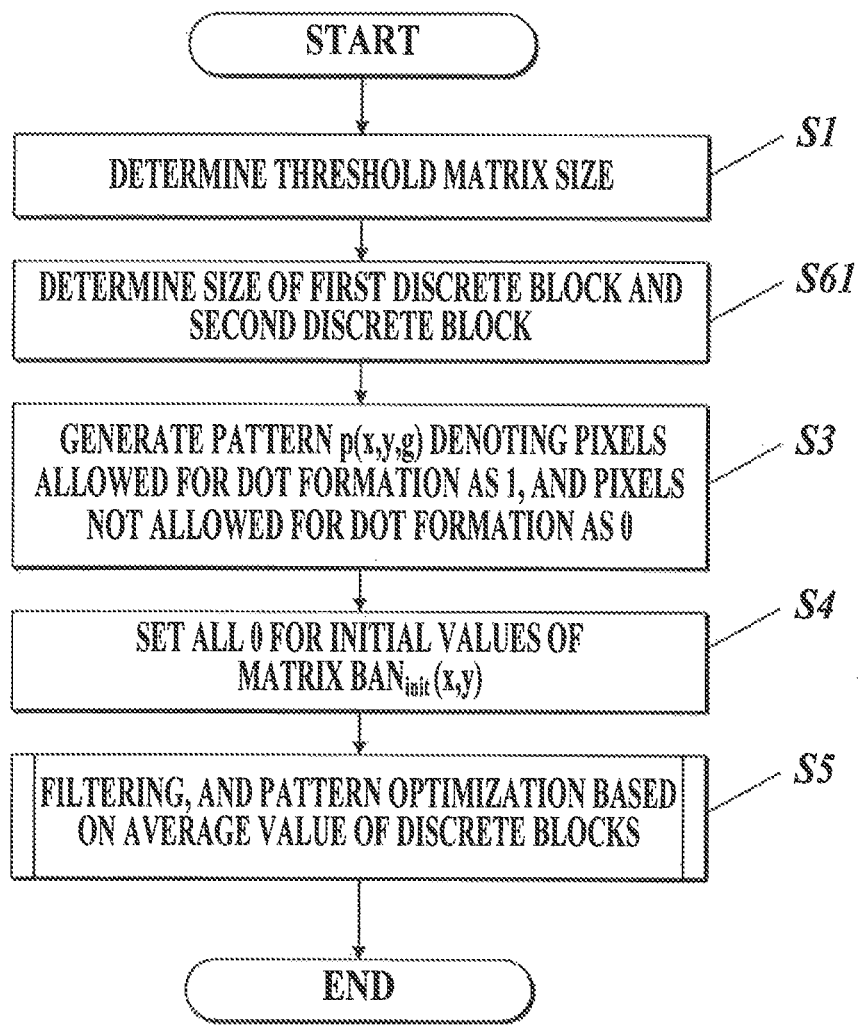
FIG. 16 This is a flow chart illustrating a flow of a process of generating an initial dot pattern according to a second embodiment.

The process of generating an initial dot pattern according to the second embodiment will be explained, referring to a flow chart in FIG. 16.

In the process of generating the initial dot pattern according to the second embodiment, step S2 in the process of generating an initial dot pattern according to the first embodiment is replaced with a process in step S61 described below.

In the process of generating an initial dot pattern according to the second embodiment, after the process in step S1, the CPU 11 determines the sizes of the first discrete block and the second discrete block (step S61). Exemplary cases shown herein relate to division of the threshold matrix having a size of 256×256 [pixels], respectively into the first discrete blocks having a size of by 64×64 [pixels], and into the second discrete blocks having a size of 32×32 [pixels]. The process in step S61 is followed by the process in step S3.

The process of generating an initial dot pattern of the second embodiment is similar to the process of generating an initial dot pattern of the first embodiment, except that the process in step S2 is replaced by the process in step S61.

Figure 17:
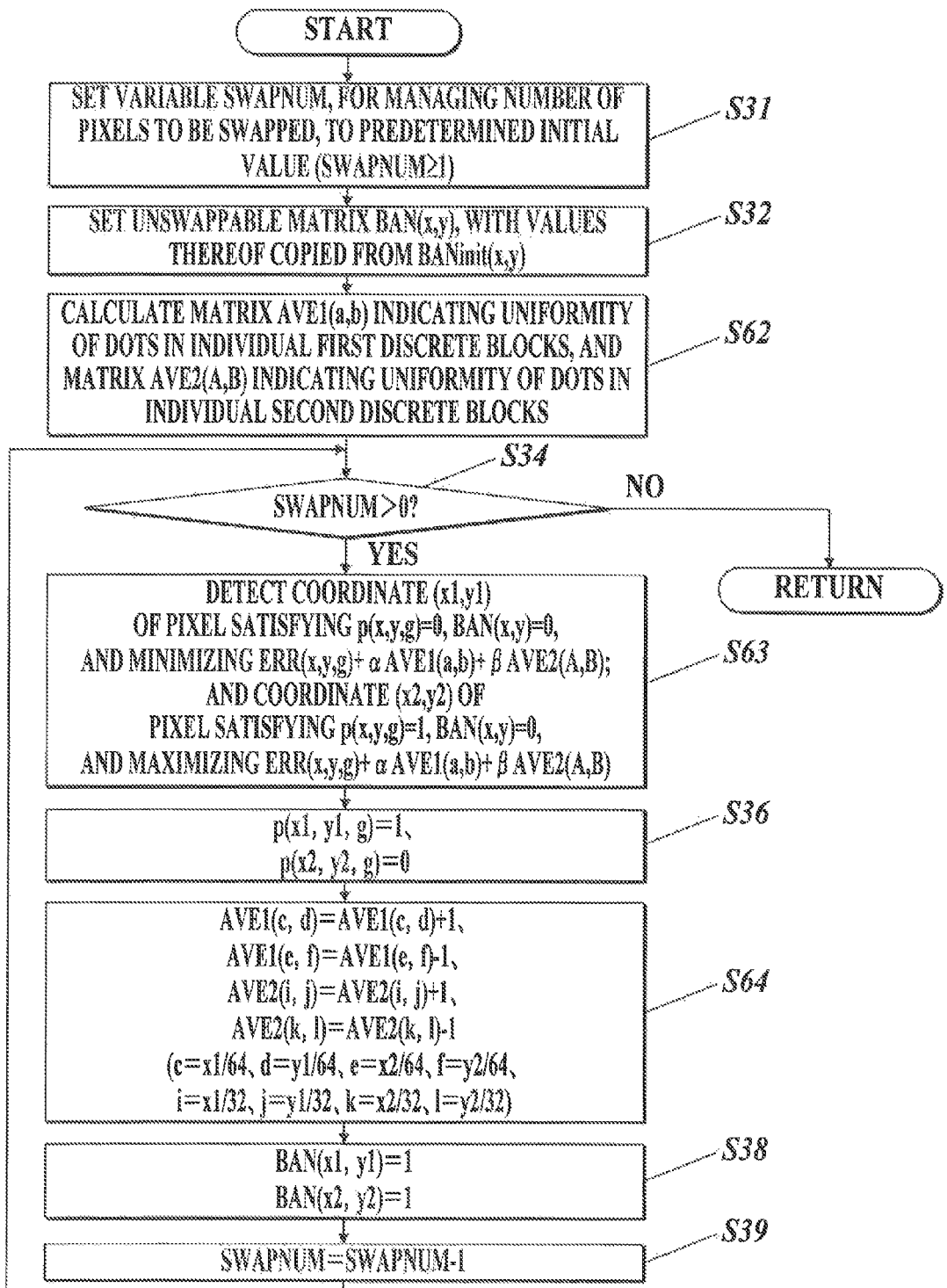
FIG. 17 This is a sub-flow chart illustrating a flow of a dot arrangement converting process according to the second embodiment.

Next, the dot arrangement converting process in the second embodiment will be explained referring to a flow chart illustrated in FIG. 17.

In the dot arrangement converting process in the second embodiment, the dot arrangement converting process in step S33 in the first embodiment is replaced by the process in step S62 described below.

In the dot arrangement converting process in the second embodiment, after the process in step S32, the CPU 11 calculates matrix AVE1($a,b$) which represents uniformity of dots in the individual first discrete blocks, and AVE2(A,B) which represents uniformity of dots in the individual second discrete blocks (step S6). The matrix AVE1($a,b$) functions as the first uniformity evaluation value which represents excess or deficiency of the number of dots in the individual first discrete blocks, and the matrix AVE2(A,B) functions as the second uniformity evaluation value which represents excess or deficiency of the number of dots in the individual second discrete blocks. The process in step S62 is followed by the process in step S34.

Figure 18:
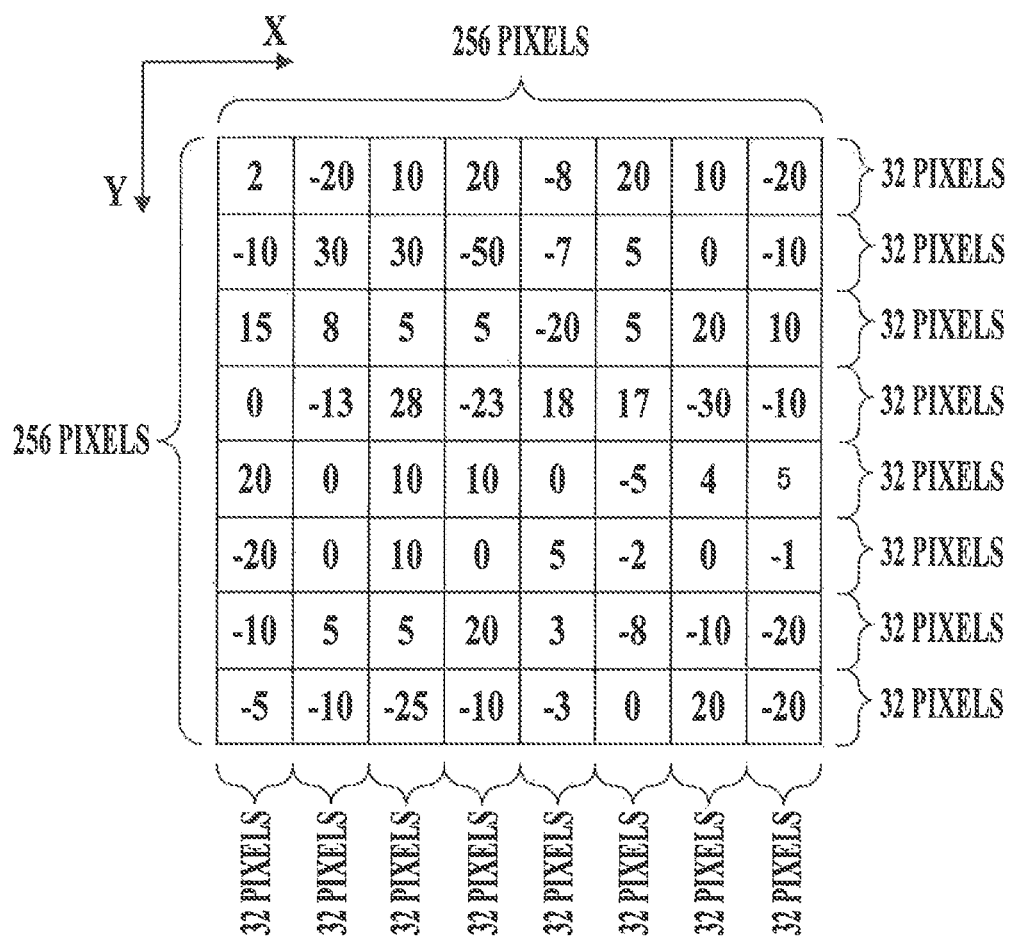
FIG. 18 This is a concept illustration showing a result obtained when exemplary values of matrix AVE2(A,B) were mapped to the individual second discrete blocks.

FIG. 18 is a concept illustration showing a result obtained when exemplary values of the matrix AVE2(A,B) are mapped to the individual second discrete blocks.

In an exemplary matrix having a gradation value g of 0.5, the number of dots necessarily generate in second discrete block, assuming that the dots are formed uniformly in all second discrete blocks, is given as 512 (32×32×0.5=512) The values of the matrix AVE2(A,B) represent excess or deficiency of the number of dots in the individual second discrete blocks, typically as illustrated in FIG. 6.

Note that the matrix AVE1($a,b$) which represents excess or deficiency of the number of dots in the first discrete blocks is same as AVE(a,b) illustrated in FIG. 8.

In the dot arrangement converting process of the second embodiment, the process in step S35 in the dot arrangement converting process of the first embodiment is replaced by the process in step S63 described below.

If the value of the variable SWAPNUM is determined to exceed 0 in step S34 (step S34: YES), the CPU 11 determines new locations of placement of dots and locations of deletion of dots (step S63).

More specifically, in the process in step S63, the CPU 11 detects a coordinate (x1,y1) of a pixel at which ERR(x,y,g)+αAVE1($a,b$)+βAVE2(A,B) is minimized, out from the pixels which satisfy p(x,y,q)=1 and BAN(x,y)=0; and a coordinate (x2,y2) of a pixel at which ERR(x,y,g)+αAVE1($a,b$)+βAVE2(A,B) is maximized, out from the pixels which satisfy p(x,y,g)=1 and BAN(x,y)=0 (step S63).

The process in step S63 is followed by the process in step S36.

In the second embodiment, correction is made based on the summation containing not only the values of ERR(x,y,g) and the values of AVE1($a,b$) multiplied by a predetermined coefficient α(α>0), where AVE1($a,b$) represents excess or deficiency of the number of dots of the individual first discrete blocks, but also containing the values of AVE2(A,B) multiplied by a predetermined coefficient β (α>0), where AVE2(A,B) represents excess or deficiency of the number of dots of the individual second discrete blocks. The correction by adding the values of AVE1($a,b$) which represents excess or deficiency of the number of dots of the individual first discrete blocks, multiplied by a predetermined coefficient α (α>0), is same as the correction by αAVE(a,b) in the first embodiment.

βAVB2(A,B) obtained by multiplying the values of AVE2(A,B) which represent excess or deficiency of the number of dots of the individual second discrete blocks by a predetermined coefficient β (β>0) and functions as correction values through addition, acts to increase ERR(x,y,g)+αAVE1($a,b$)+βAVE2(A,B), if the number of dots in the second discrete block exceeds the average value (AVE2(A,B)>0). On the other hand, the βAVE2(A,B) acts to reduce ERR(x,y,g)+αAVE1($a,b$)+βAVE2(A,B), if the number of dots in the second discrete block comes short of the average value (AVE2(A,B)<0).

Now, exemplary correlations of the matrix AVE1($a,b$) which represents excess or deficiency of the number of dots in the individual first discrete blocks, and the matrix AVE2(A,B) which represents excess or deficiency of the number of dots in the individual second discrete blocks, are respectively illustrated in FIG. 19A and FIG. 19B, FIG. 19A is a concept illustration showing a result of mapping of exemplary values of matrix AVE1($a,b$) to the individual first discrete blocks. FIG. 19B is a concept illustration showing a result of mapping of exemplary values of matrix AVE2(A,B) to the individual second discrete blocks.

It is understood that even if the excess and deficiency of dots in each second discrete block falls within a range of ±1, showing only a small nonuniformity in the distribution of dots as illustrated in FIG. 19B, excess or deficiency of dots in each first discrete block may range from −3 to +4 as illustrated in FIG. 19A, showing a relatively large nonuniformity in the distribution of dots.

The second embodiment is, therefore, aimed at further improving uniformity in the distribution of dots in the matrix pattern, by combining both of correction based on the excess or deficiency of the number of dots in the individual first discrete blocks, and correction based on excess or deficiency of the number of dots in the individual second discrete blocks, Note that "A" in AVE2(A,B) represents a remainder of division of x by the number of pixels (32, for example) in the X-direction of the second discrete block, and "B" represents a remainder of division of y by the number of pixels (32, for example) in the Y-direction of the second discrete block.

In the dot arrangement converting process in the second embodiment, the process in step S37 in the dot arrangement converting process in the first embodiment is replaced by the process in step S64 described below.

After the process in step S36, the CPU 11 changes the values of AVE1($a,b$) of the first discrete blocks and the values of AVE2(A,B) of the second discrete blocks, which contain the pixels where the dots were rearranged (step S64). More specifically, the CPU 11 adds 1 to the values of AVE1($c,d$) which represent excess or deficiency of the number of dots of the first discrete block containing the pixel(x1,y1), and subtracts 1 from the values of AVE1($e,f$) which represent excess or deficiency of the number of dots of the first discrete block containing the pixel(x2,y2). The CPU 11 then adds 1 to the values of AVE2($i,j$) which represent excess or deficiency of the number of dots of the second discrete block containing the pixel (x1,y1), and subtracts 1 from the values of AVE2($k,l$) which represent excess or deficiency of the number of dots of the second discrete block containing the pixel(x2,y2).

The process in step S64 is followed by the process in step S38.

In this process, c and e may be determined by integer values of quotients obtained by dividing x1 and x2 by the number of pixels (64, for example) in the X-direction of the first discrete block, and, d and f may be determined by integer values of quotients obtained by dividing y1 and y2 by the number of pixels (64, for example) in the Y-direction of the first discrete block. i and k may be determined by integer values of quotients obtained by dividing x1 and x2 by the number of pixels (32, for example) in the X-direction of the second discrete block, and, j and l may be determined by integer values of quotients obtained by dividing y1 and y2 by the number of pixels (32, for example) in the Y-direction of the second discrete block.

Except for the aspects of the second embodiment described in the above, all configurations and details of processes are same as those in the first embodiment.

Figure 20:
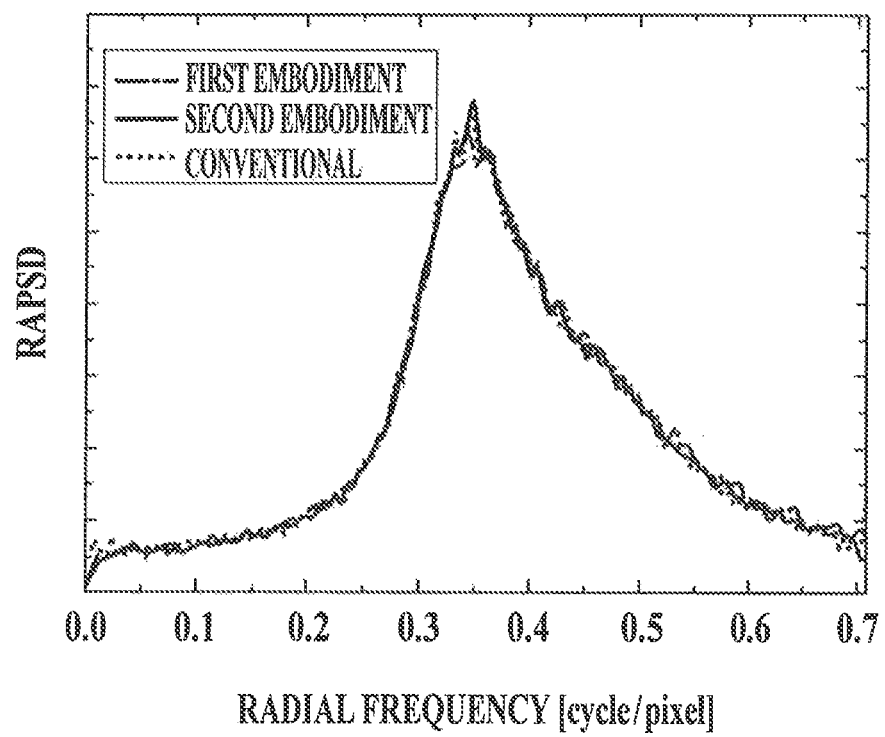
FIG. 20 This is a graph illustrating RAPSD corresponding to the dot pattern with a dot ratio of 50%, obtained by the method of generating a threshold matrix according to the second embodiment.
Figure 21:
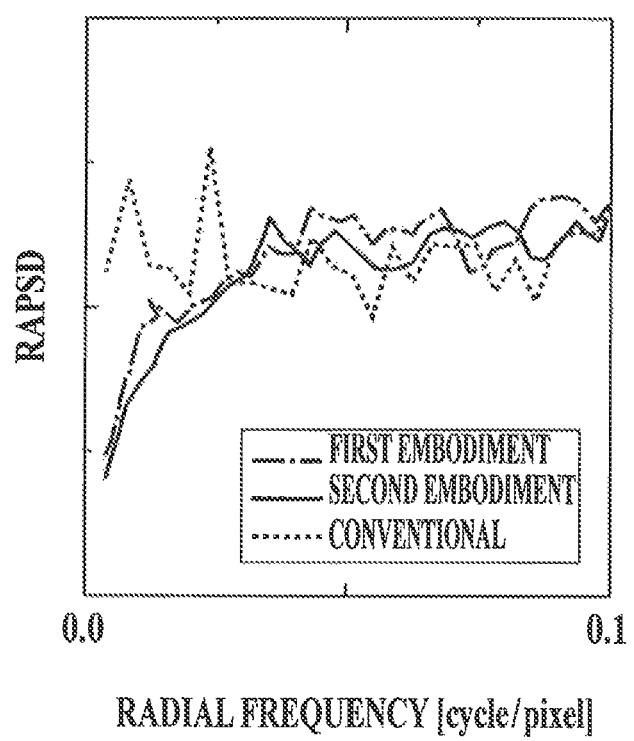
FIG. 21 This is a partial enlarged drawing of low-frequency components in the graph illustrated in FIG. 20.

FIG. 20 is a graph illustrating RAPSD corresponding to the dot pattern with a dot ratio of 50%, obtained by the method of generating a threshold matrix according to the second embodiment. FIG. 21 is a partial enlarged drawing of low-frequency components in the graph illustrated in FIG. 20.

As seen in FIG. 20 and FIG. 21, the dot pattern obtained using the threshold matrix generated by the method of generating a threshold matrix of the second embodiment is suppressed in the low-frequency components in a further successful manner. This indicates that the uniformity of dots in the dot pattern is further improved, and thereby nonuniformity in density in the dithered image may be reduced in a more successful manner. As will be described later, there is a correlation between the size of the discrete block as a unit of storing the number of dots, and the range of spatial frequency distribution to be suppressed as a consequence. Accordingly, by using the discrete blocks of a plurality of sizes as described in the second embodiment, it is now possible to suppress frequency components in a plurality of spatial frequency ranges. In short, the method of generating a threshold matrix of the second embodiment can provide a threshold matrix capable of more successfully reducing the nonuniformity in density in, the dithered image.

According to the second embodiment, the dot pattern having more uniform arrangement of dots may be generated, by swapping the arrangement of dots, while enhancing the correction by the uniformity evaluation of dots in the discrete blocks of a plurality of sizes. Accordingly, the threshold matrix Th(x,y) may be generated by using the dot patterns having more uniform dot arrangement for the individual gradation values. In short, since the dithering using the threshold matrix Th(x,y) gives uniform dot arrangement under any arbitrary gradation value g, so that nonuniformity in density in the dithered image may be reduced in a successful manner.

Examples of evaluation of the dot pattern generated by the process of generating a threshold matrix according to the present invention will be shown below. Granularity of the dot pattern is evaluated using values obtained by multiplying RAPSD by VTF (Visual Transfer Function: spatial frequency characteristics of the sense of sight) on the frequency component basis, and integrating the products with respect to frequency. The smaller the integrated value, the less recognizable the visual noise.

Figure 22:
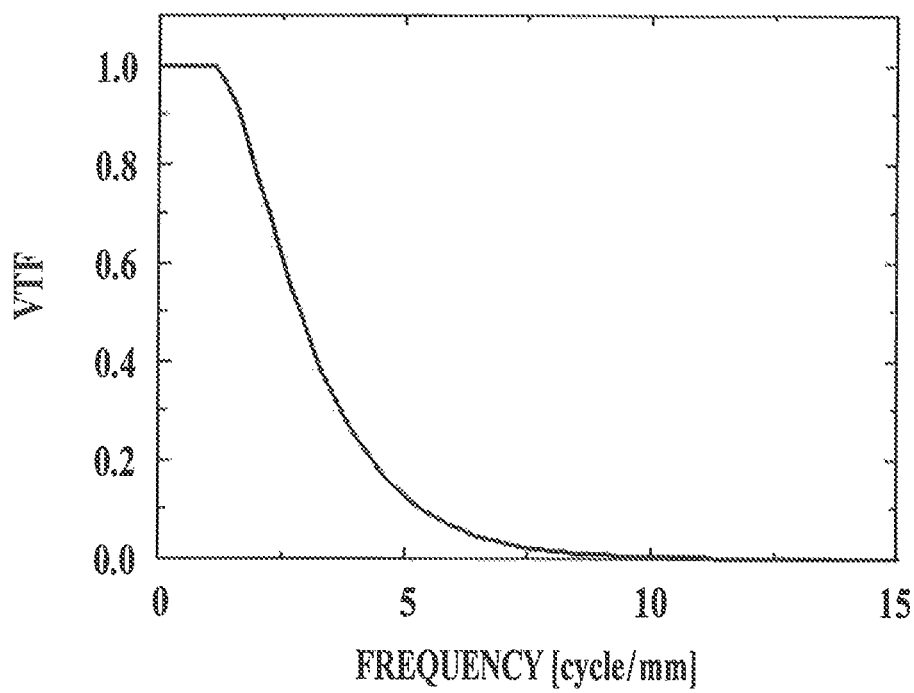
FIG. 22 This is a graph illustrating relation between frequency and VTF values.

FIG. 22 is a graph illustrating relation between frequency and VTF values. The VTF illustrated in FIG. 22 corresponds to the case where observation distance to the dot pattern is 30 [cm]. The curve may be given by the equations (3), (4) below. In the equation (4), R represents the observation distance [mm].

[Mathematical Formula 3]

$$VTF(u)=5.05e^{-0.138t}(1-e^{-0.1t}) \quad (3)$$

$$t=Ru\pi/180 \text{(cycle/degree)} \quad (4)$$

Figure 23:
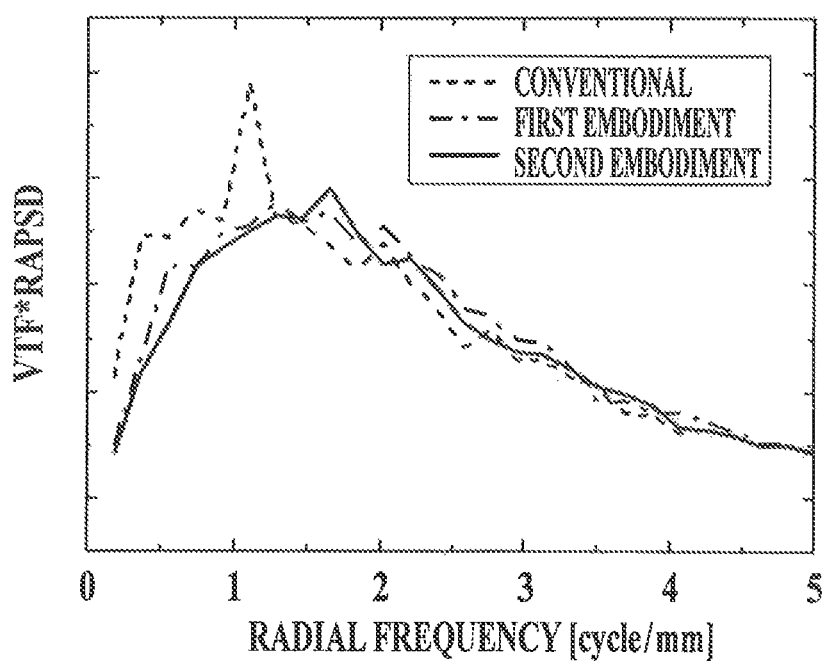
FIG. 23 This is a graph illustrating results of multiplication of RAPSD and VTF, on the frequency component basis.

FIG. 23 is a graph illustrating results of multiplication of RAPSD and VTF, on the frequency component basis.

According to the sense of sight, lower frequency components are visually sensed more strongly as a noise, and as a nonuniformity in density of pattern as a consequence. On the other hand, according to the dot pattern generated using the conventional threshold matrix, removal of the high frequency components has unfortunately increased the low-frequency components, due to restriction on the degree of freedom of the dot arrangement caused by the removal of the high-frequency components. In particular, a dot pattern aimed at removing the high-frequency components, such as green noise dot pattern, generated by using the conventional threshold matrix, has resulted in degraded image quality due to increased low-freguency components.

In contrast, the first embodiment and the second embodiment are very effective for generating the dot pattern aimed at removing therefrom the high-frequency components and the low-frequency components. Besides a pattern design for obtaining a desired pattern, this embodiment also employs a design for obtaining a desired dot pattern by applying a process for suppressing the components in the low-frequency range, in particular in the range of 2 cycle/mm or below. By virtue of the design, the dot pattern well suppressed in the noise and nonuniformity in density may be obtained.

When the input image values are quantized based on results of comparison with the threshold matrix obtained by stacking the dot patterns, an obtainable pattern will be the same as the dot pattern used for generating the threshold matrix.

For example, when input data larger than the threshold matrix size and having the gradation value g is quantized according to the above-described method of quantization, the resultant dot pattern will be the same as the dot pattern with the gradation value g, obtained in the process of generating the threshold matrix.

This is because the generation of the dot pattern under the stacking constraint conditions means that the dot pattern with the gradation value g will always have the dots added to the dot locations in the dot pattern with the gradation value $g-\delta q$, so that the threshold values at the dot locations created under small gradation values will grow to have a relatively large value in the threshold matrix. As a consequence, the threshold value corresponding to the dot locations obtained under a gradation value smaller than the gradation value g will become larger than the threshold value corresponding to the gradation value g, whereas the threshold value corresponding to the dot locations obtained under a gradation value larger than the gradation value g will become smaller than the threshold value corresponding to the gradation value g.

Figure 24:
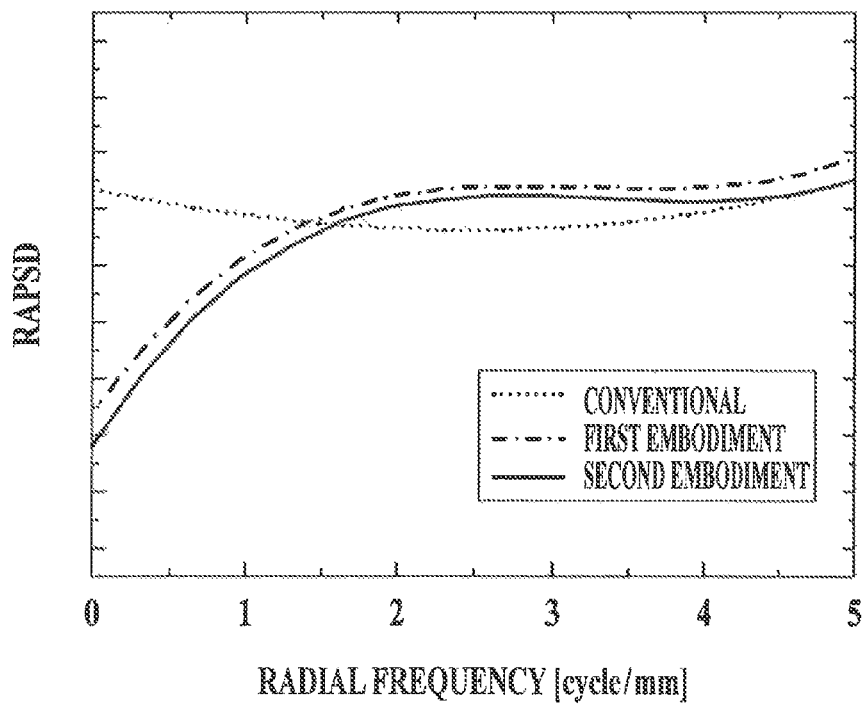
FIG. 24 This is a graph illustrating RPSD in an extremely low frequency region (0<f<5 cycle/mm).
Figure 25:
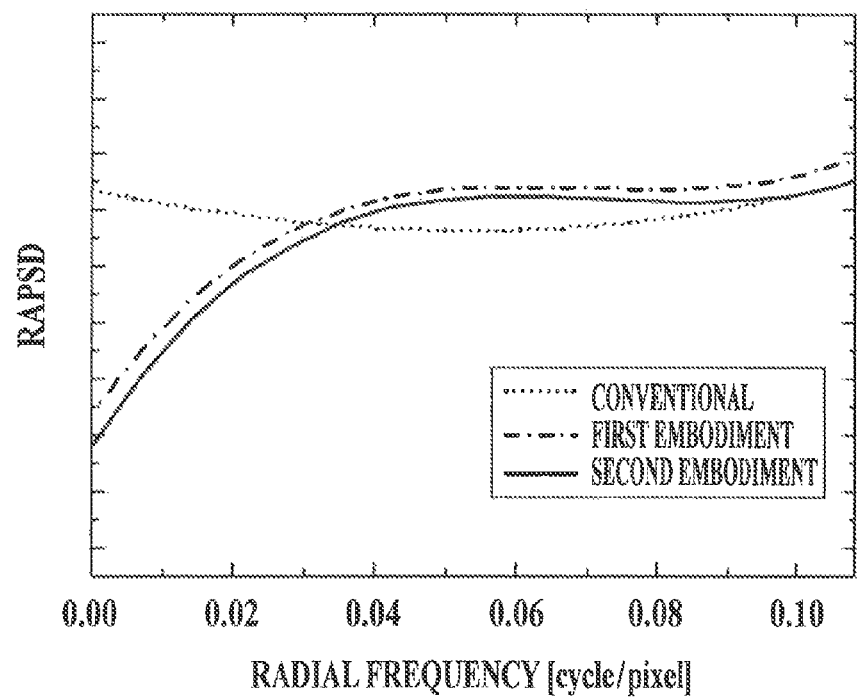
FIG. 25 This is a graph illustrating RAPSD in a pixel-based region of 0<f<0.1 [cycle; pixel].

FIG. 24 and FIG. 25 illustrate RAPSD of the dot patterns with a dot ratio of 0.5, as examples of RAPSD obtained by quantization using the threshold matrices of the individual embodiments of the present invention and the conventional threshold matrix.

FIG. 24 is a graph illustrating RAPSD in an extremely low frequency region (0<f<5 cycle/mm).

FIG. 25 is a graph illustrating RAPSD in a pixel-based region of 0<f<0.1 [cycle/pixel]

FIG. 24 shows curves obtained by subjecting the dot patterns used for generating the threshold matrices to curve fitting using a third-order polynomial in the extremely low frequency region (0<f<5 cycle/mm), and FIG. 25 is another expression of FIG. 24 on the pixel basis, showing results of curve fitting using a third-order polynomial in a region of 0<f<0.1 [cycle/pixel] In other words, the curves shown in FIG. 24 and FIG. 25 are obtained by subjecting the radial average power spectrum density distribution relative to the spatial frequency of the dot pattern, to the curve fitting using a third-order polynomial.

The individual curves illustrated in FIG. 24 and FIG. 25 may be given, for example, by the equations (5) to (7) below (where, X is frequency in the radial direction and given in [cycle/pixel]).

[Mathematical Formula 4]

Conventional:

$$RAPSD=3.17\times10^{-4}-1.25\times10^{-3}\times X+9.51\times10^{-3}X^2+2.61\times10^{-2}+X^3 \quad (5)$$

First Embodiment $$RAPSD=1.20\times10^{-4}+8.88\times10^{-3}\times X-1.28\times10^{-1}+X^2+6.08\times10^{-1}+X^3 \quad (6)$$

Second Embodiment $$RAPSD=9.20\times10^{-5}+1.25\times10^{-3}\times X-1.38\times10^{-1}X^2+6.31\times10^{-1}+X^3 \quad (7)$$

As described in the above, since the first embodiment and second embodiment of the present invention intentionally remove the components in the region of 2 cycle/mm (0.05 cycle/pixel) or below, so that each of the results of fitting illustrated in FIG. 24 and FIG. 25 shows an inflection point in the range from 0 to 5 cycle/mm (0 to 0.1 cycle/pixel) (the inflection point is found at X≈−0.122 [cycle/pixel] for the conventional case, at X≈0.071 [cycle/pixel] for the first embodiment, and at X≈0.073 [cycle/pixel] for the second embodiment). As is clear from the above, according to the threshold matrices of the individual embodiments of the present invention, the dot patterns generated for generating the threshold matrices show inflection points in the radial average power spectrum distribution relative to the spatial frequency, in a spatial frequency range of 0.1 [cycle/pixel] or below. While FIG. 24 and FIG. 25 exemplified the dot patterns with a dot ratio of 0.5, when the dot pattern with a dot ratio of 0.5 is used for generating the threshold matrix obtained in the individual embodiments of the present invention, and when the radial average power spectrum density distribution relative to the spatial frequency of the dot pattern is fitted by a third-order polynomial in the region of a spatial frequency of 0.1 [cycles/pixel] or below, the fitted curve has an inflection point in the region, and decreases in the region of a spatial frequency of 0.05 [cycles/pixel] or below as the spatial frequency decreases.

As described in the above, when the dot pattern with a dot ratio of 0.5 is used for generating the threshold matrix obtained in the individual embodiments of the present invention, and when the radial average power spectrum density distribution relative to the spatial frequency is fitted by a third-order polynomial in the region of a spatial frequency of 0.1 [cycles/pixel] or below, the fitted curve has an inflection point in the above region, and decreases in the region of a spatial frequency of 0.05 [cycles/pixel] or below as the spatial frequency decreases. By the configuration, the low-frequency components in the RAPSD of the dot pattern may be suppressed in a successful manner. Accordingly, by generating the dot pattern by using the threshold matrices obtained by the individual embodiments of the present invention, the dot pattern showing almost uniform dot arrangement over all discrete blocks may be generated. In addition, the present invention can solve a known drawback of the method of generating a threshold matrix described in Patent Document 3, such that the generated threshold matrix only yields a poor distribution of the dot pattern due to a strict restriction on the arrangement of dots, and produces nonuniformity in density in the dithered image, and thereby can provide a threshold matrix capable of more successfully reducing the nonuniformity in density in the dithered image.

While the graph shown in FIG. 24 was obtained using the dot pattern with a dot density of 1200 [dpi], a dot pattern with other arbitrary dot density may be adoptable to the threshold matrix of the present invention and the dot pattern thereof. For example, with a dot density of 1440 [dpi], the dot pattern is designed to have an inflection point by the fitting in the range from 0 to 5.7 cycle/mm.

It is to be understood that the embodiments of the present invention disclosed herein are illustrative but not restrictive in all aspects. The scope of the present invention is defined by the appended claims rather than by the foregoing description, and is intended to cover all modifications within the appended claims and equivalence thereof For example, in the process of generating the threshold matrix, it is not always necessary to stack the dot patterns from g=0 to g=1. For example, if the output limit of the quantizer is given by g=Q(Q<1), based on the physical restriction of the image forming device used for forming the dot pattern, only threshold values configured by numerals of $0 < g \leq Q$ stored in a memory will suffice for the process.

For the case where η steps of gradation from g=0 to g=Q are desired, stacking of the dot patterns from g=0 to g=Q−1/η will suffice for generating the threshold matrix.

For example, while the threshold matrix generating device of this embodiment generates the individual dot patterns with the gradation values from 0 to 1, determined by increment or decrement by the amount of change δg in gradation value to or from gradation value g=0.5, the gradation values of the individual dot patterns to be generated may arbitrarily be set over the range from 0 to a predetermined value Q ($0.5 \leq Q \leq 1$).

Alternatively, the discrete block size may be altered depending on the gradation value g. Correlation between the gradation value q and the discrete block size will be explained below.

Figure 26:
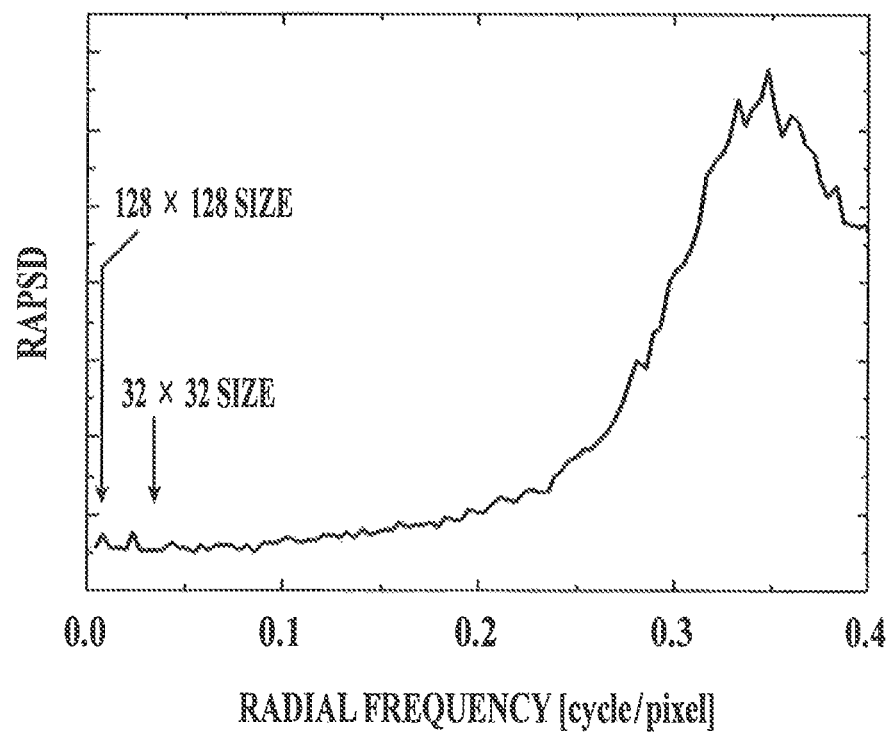
FIG. 26 This is an explanatory drawing illustrating an exemplary correlation between discrete block size and low-frequency components to be suppressed.

FIG. 26 illustrates an exemplary correlation between discrete block size and low-frequency components to be suppressed.

For an exemplary threshold matrix of 256×256 [pixels], the process of averaging the number of dots of the individual discrete blocks using a discrete block of 32×32 [pixels] is effective to suppress components at and around $1/32$ component in the direction of radial frequency. The components at and around $1/32$ component in the direction of radial frequency correspond to the low-frequency components found at and around a radial frequency of 0.03 [cycle/pixel] in FIG. 26. On the other hand, for an exemplary threshold matrix of 256×256 [pixels], the process of averaging the number of dots of the individual discrete blocks using a discrete block of 128×128 [pixels] is effective to suppress components at and around $1/128$ component in the direction of radial frequency. The components at and around $1/128$ component in the direction of radial frequency correspond to the low-frequency components found at and around a radial frequency of 0.01 [cycle/pixel] in FIG. 26.

As described in the above, the frequency component to be suppressed varies depending on the discrete block size relative to the matrix size.

Figure 27A:
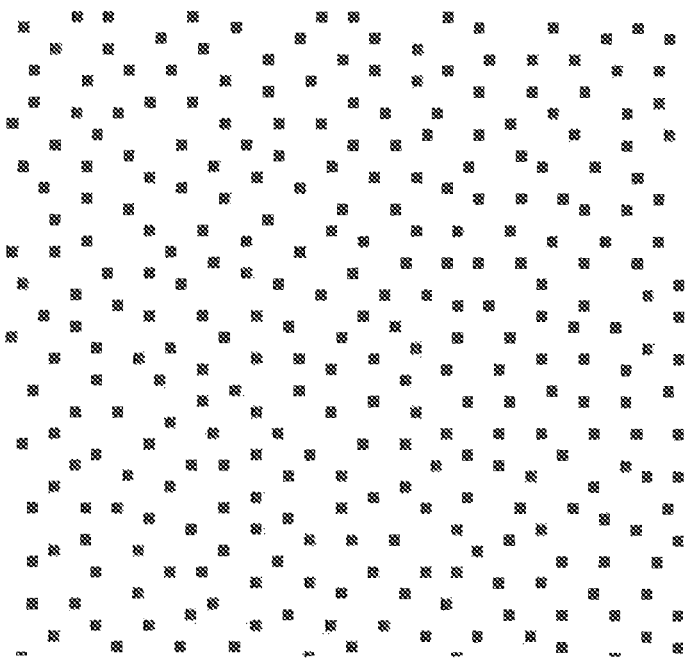
FIG. 27A This is a drawing illustrating a result of processing under g=2, given a discrete block size of 128×128 [pixels].
Figure 27B:
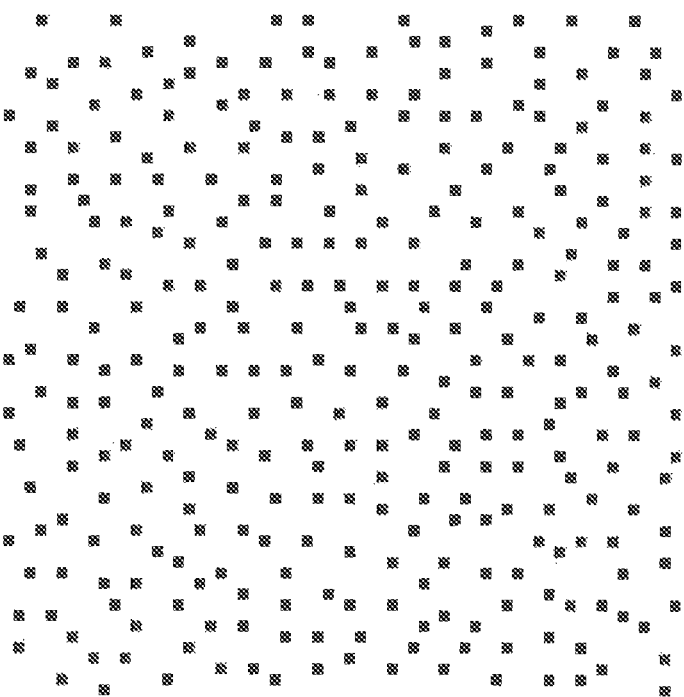
FIG. 27B This is a drawing illustrating a result of processing under g=0.2, given a discrete block size of 32×32 [pixels].

FIGS. 27A and 27B are drawings comparatively illustrating results of processing under g=0.2, with a discrete block size of 32×32 [pixels] and 128×128 [pixels]. FIG. 27A illustrates the result of processing under g=0.2, and a discrete block size of 128×128 [pixels]. FIG. 27B illustrates the results of processing under g=0.2, and a discrete block size of 32×32 [pixels].

As seen in FIGS. 27A and 27B, when g=0.2, the discrete block having a size of 128×128 [pixels] gives a dot distribution which is visually more uniform than that given by a size of 32×32 [pixels]. The reason why is as follows.

Figure 28:
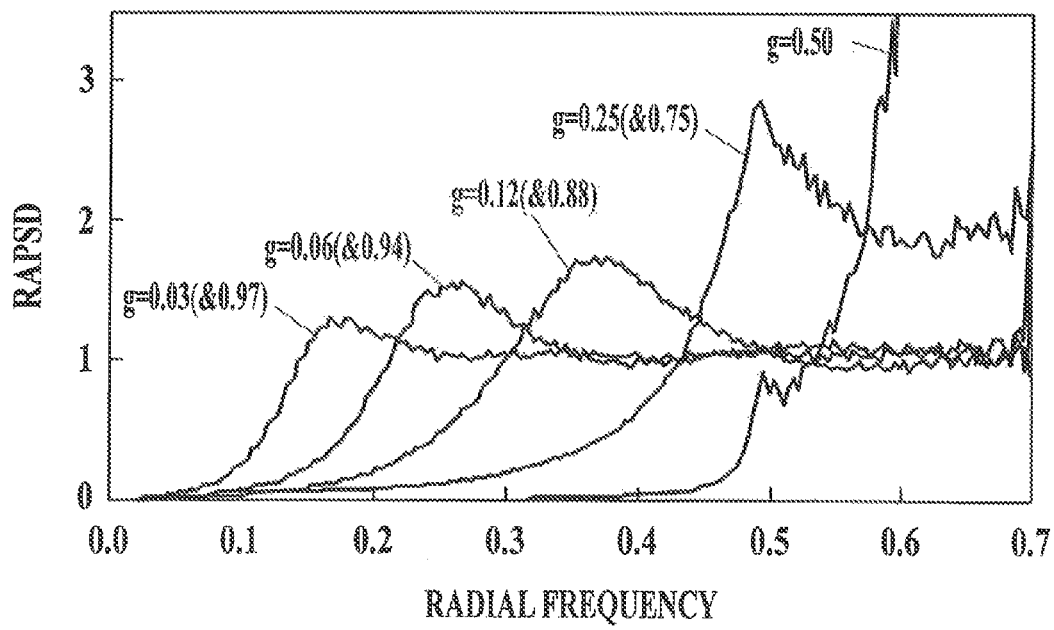
FIG. 28 This is a graph illustrating difference of RAPSD depending on the gradation value.

Difference of RAPSD depending the gradation value is shown in FIG. 28.

As seen in FIG. 28, the frequency pattern varies depending on the gradation value g. The peak of frequency shifts towards the high frequency side as the gradation value g approaches 0.5, and shifts towards the low frequency side as the gradation value approaches 0 or 1.

Since the frequency pattern varies depending on the gradation value g as seen in the above, so that the size of the discrete block optimum to suppress the low-frequency components varies. More specifically, since the frequency peak of the dot pattern shifts towards the low frequency side as the gradation value g approaches 0 or 1, so that the discrete block of lower frequency side, or a large discrete block, is suitable so as not to deform the frequency pattern. On the other hand, since the frequency peak of the dot pattern shifts towards the high frequency side as the gradation value g approaches 0.5, so that a small discrete blocks capable of suppressing relatively high frequency components is suitable. Accordingly, by varying the size of the discrete block depending on the gradation value g of the matrix pattern, the threshold matrix capable of more successfully reducing nonuniformity in density in the dithered image may be provided.

Exemplary correlation between the gradation value and the discrete block size, given a matrix size of 256×256 [pixels], is shown in FIG. 29.

As seen in FIG. 29, as for the gradation value g, by selecting a discrete block size of 128×128 [pixels] when 0≤g<0.125 or 0.875≤g<1; selecting a discrete block size of 64×64 [pixels] when 0.125≤g<0.25 or 75≤g<0.75; and by selecting a discrete block size of 32×32 [pixels] when 0.25≤g<0.75, the threshold matrix capable of more successfully reducing nonuniformity in density of the dithered image may be provided, The correlation between the gradation value and the discrete block size may also be used to determine whether the uniformity is evaluated based on a single discrete block or based on a plurality of discrete blocks FIG. 30 illustrates exemplary correlation among the gradation value, the number of discrete blocks and the size of discrete blocks, given a matrix size of 256×256 [pixels].

As seen in FIG. 30, as for the gradation value g, by evaluating the uniformity based on the discrete block of 128×128 [pixels] when 0≤g<0.125 and 0.875≤g<1; based on two types of discrete blocks of 128×128 [pixels] and 64×64 [pixels] when 0.1.25≤g<0.2 or 0.75≤g<0.75; and based on three types of discrete blocks of 128×128 [pixels], 64×64 [pixels] and 32×32 [pixels] when 0.25≤g<0.75, the threshold matrix capable of more successfully reducing nonuniformity in density of the dithered image may be provided, In addition, as described in the above, the quantized pattern generated not only by filtering, but also by using the threshold matrix of 256×256 [pixels], having the threshold values determined so as to stabilize the average values of the discrete blocks of 32×32 [pixels], 64×64 [pixels], 128×128 [pixels] or the like, is more thoroughly suppressed in the components of 0.05 [cycle/pixel] or below in RAPSD corresponding to the quantized pattern, as compared with the quantized pattern generated using the threshold matrix generated by the general filtering only. The range of RAPSD corresponds to approximately 2.36 [cycle/mm] or below, on a printer with a resolution of 1200 [dpi]. In this way, by suppressing very low spatial frequency components, which are visually affective, but by leaving the residual components unchanged from the filter design, it is now possible to yield a quantized pattern which is visually free from nonuniformity in density, while keeping the dot pattern unchanged from the design as a whole.

[Quantizer]

Next, a quantizer 200 used for quantizing the image using the threshold matrix generated by the above-described threshold matrix generating device and/or the method of generating a threshold matrix will be explained. The quantizer 200 is used for quantizing gradation data having a gradation value of m (integer, m≥3) in the individual pixels composing the original image, down to those having a gradation value of n (integer, m>n).

Figure 31:
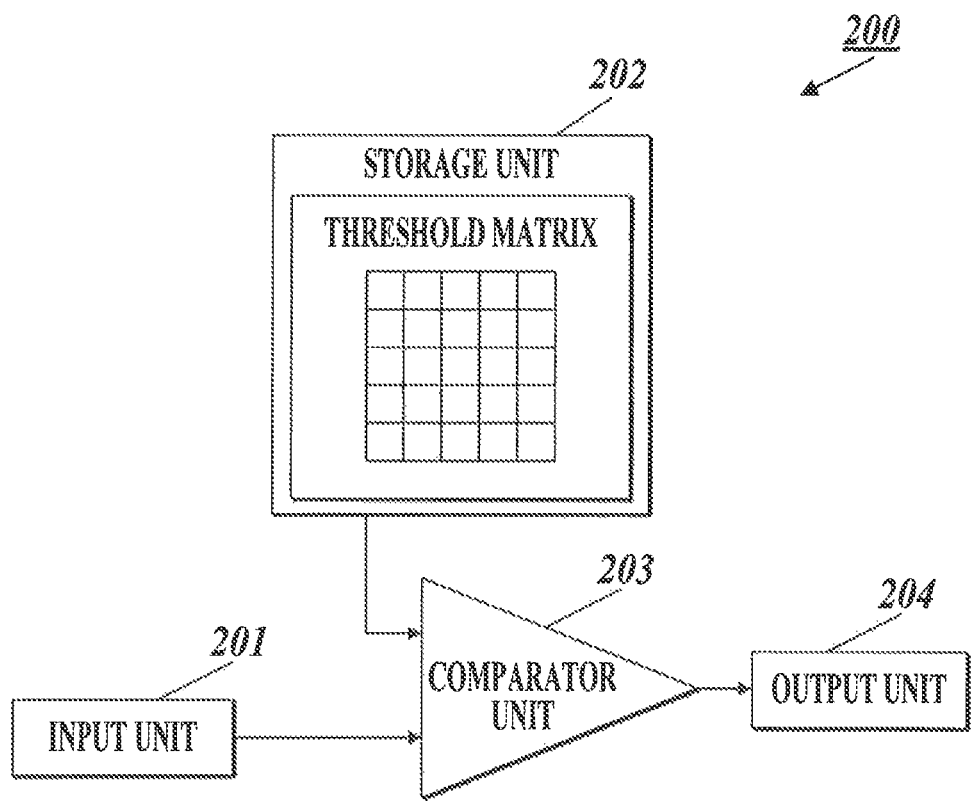
FIG. 31 This is a block diagram illustrating a configuration of a quantizer 200.

A configuration of the quantizer 200 is illustrated by a block diagram in FIG. 31.

The quantizer 200 has an input unit 201, a storage unit 202, a comparator unit 203 and an output unit 204, The input unit 201 inputs an image data to be quantized to the comparator unit 203.

The storage unit 202 stores the threshold matrix used for generating the dot patterns as quantized images. The threshold matrix stored in the storage unit 202 is the threshold matrix generated by the above-described method of generating a threshold matrix. For example, the threshold matrices stored in the storage unit 202 include the threshold matrix generated by the first and second embodiments described in the above, and a threshold matrix of 256×256 [pixels] having the threshold values determined not only by filtering, but also by stabilizing the average values of the discrete blocks of 32×32 [pixels], 64×64 [pixels], 128×128 [pixels] or the like.

The comparator unit 203 compares the pixel values of the image data received from the input unit 201, with the threshold values of the threshold matrix stored in the storage unit 202.

The output unit 204 generates the quantized image data based on the result of comparison given by the comparator unit, and outputs the quantized image data.

As described in the above, the quantized pattern generated by using the threshold matrix of 2.56×256 [pixels], having the threshold values determined not only by filtering, but also by stabilizing the average values of the discrete blocks of 32×32 [pixels], 64×64 [pixels], 128×128 [pixels] or the like, is more thoroughly suppressed in the components of 0.05 [cycle/pixel] or below in RAPSD corresponding to the quantized pattern, as compared with the quantized pattern generated using the threshold, matrix generated by the general filtering only. The range of RAPSD corresponds to approximately 2.36 [cycle/mm] or below, on a printer with a resolution of 1200 [dpi]. This indicates that the quantized pattern of the image quantized by the quantizer 200 shows a slope of spectrum density relative to spatial frequency, in the region of 2.36 [cycle/pixel] or below in the spatial frequency distribution, which is larger than the slope of spectrum density relative to spatial frequency in the region of 0.05 [cycle/pixel] or above. In this way, by suppressing very low spatial frequency components, which are visually affective, but by leaving the residual components unchanged from the filter design, it is now possible to yield a quantized pattern which is visually free from nonuniformity in density, while keeping the dot pattern unchanged from the design as a whole.

The quantizer 200 can generate the dot pattern showing almost uniform dot arrangement over all discrete blocks. In addition, the present invention can solve a known drawback of the method of generating a threshold matrix described in Patent Document 3, such that the generated threshold matrix only yields a poor distribution of the dot pattern due to a strict restriction on the arrangement of dots, and produces nonuniformity in density in the dithered image, and can thereby provide a threshold matrix capable of more successfully reducing the nonuniformity in density in the dithered image.

[Image Forming Device]

Next, an image forming device 300 having the above-described quantizer 200 will be explained. The image forming device 300 uses, as an input image data, gradation data having a gradation value of m (integer, m≤3) in the individual pixels composing the original image, generates output image data having a gradation value of n (integer, m>n) based on the input image data, and forms an image on a recording medium based on the output image data. The output image data of the image forming device 300 of this embodiment is the quantized image data output by the quantizer 200.

Figure 32:
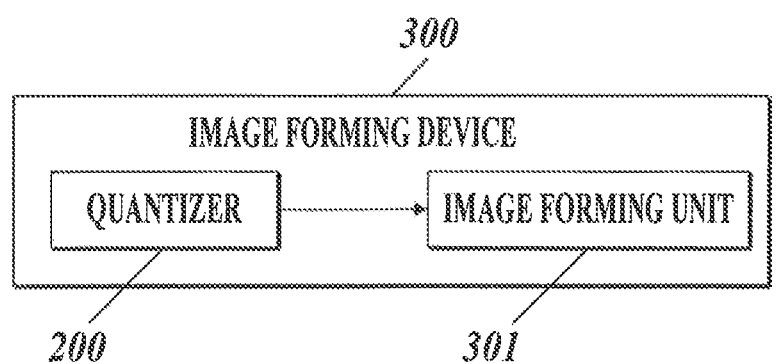
FIG. 32 This is a block diagram illustrating a configuration of an image forming device 300.
Figure 33:
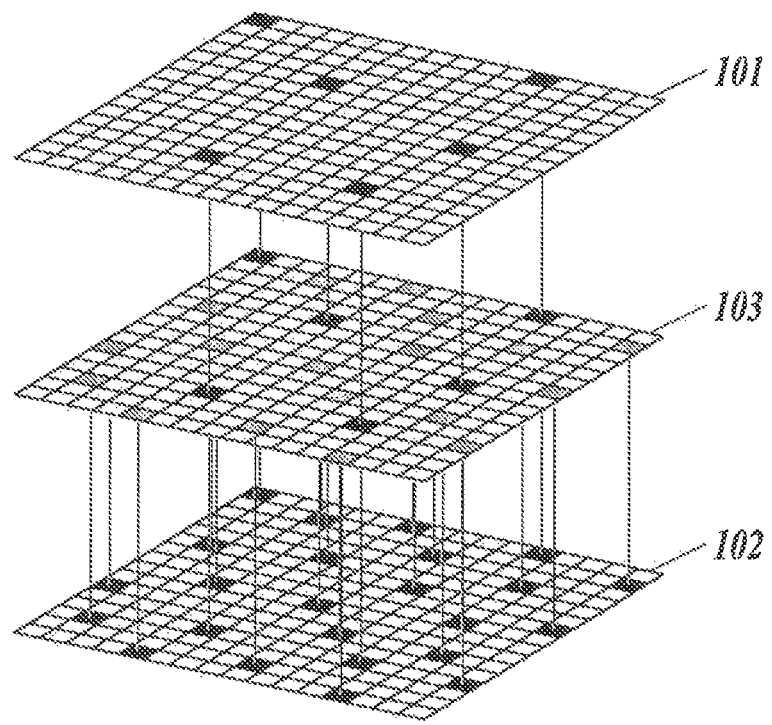
FIG. 33 This is a concept illustration showing a threshold matrix generation process under the conventional stacking constraint conditions.
Figure 34:
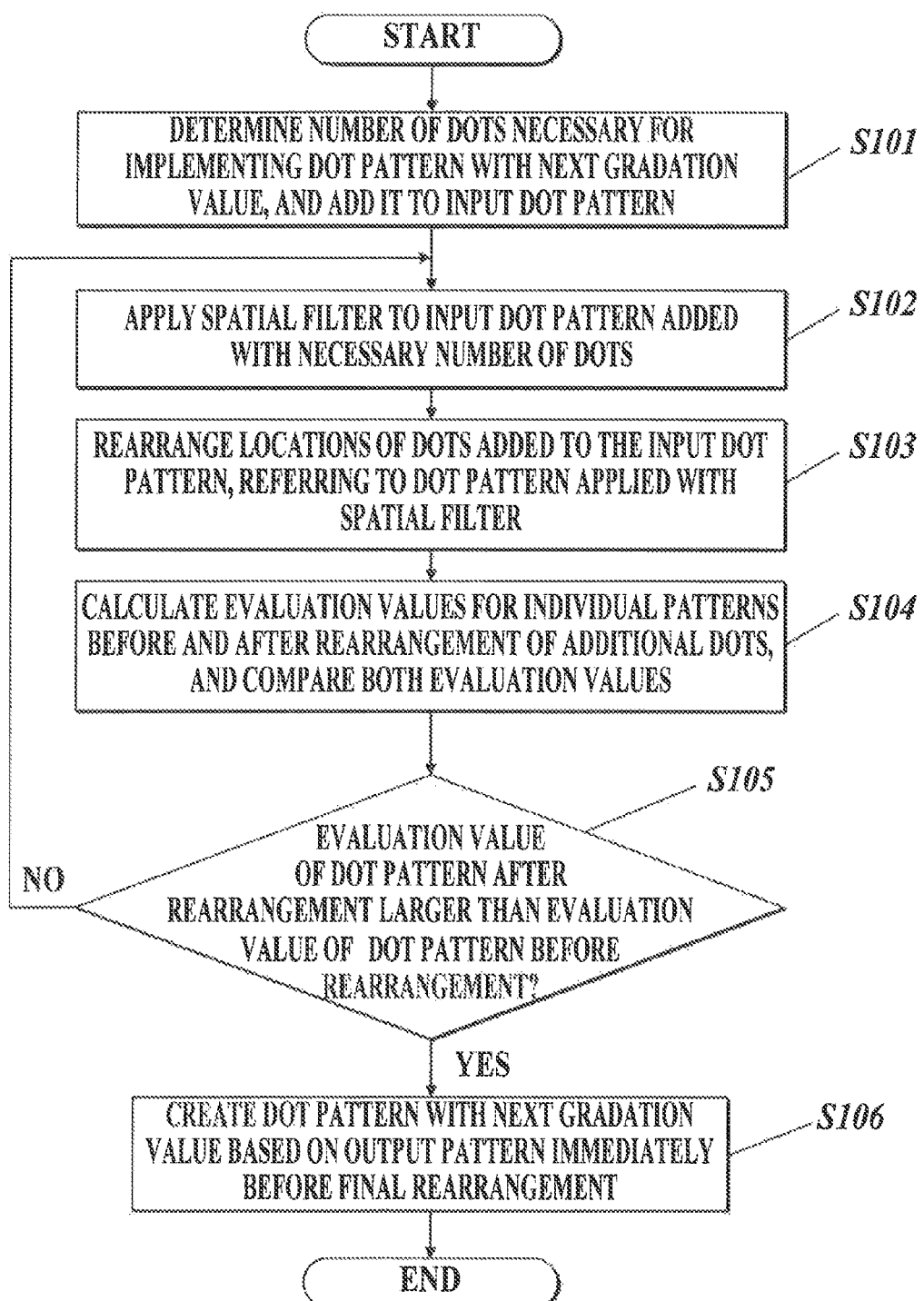
FIG. 34 This is a flow chart illustrating a flow of a threshold matrix generating process under the conventional stacking constraint conditions.
Figure 35:
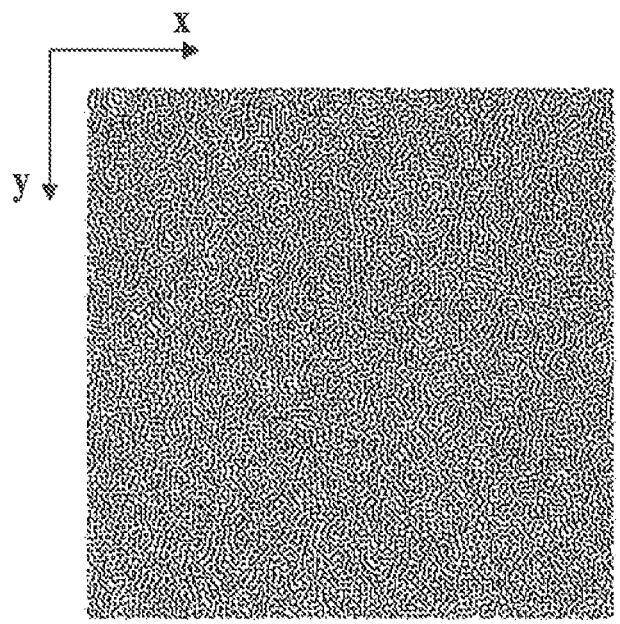
FIG. 35 This is a drawing illustrating an exemplary dot pattern with a dot ratio of 50% generated by the conventional space filter method.
Figure 36:
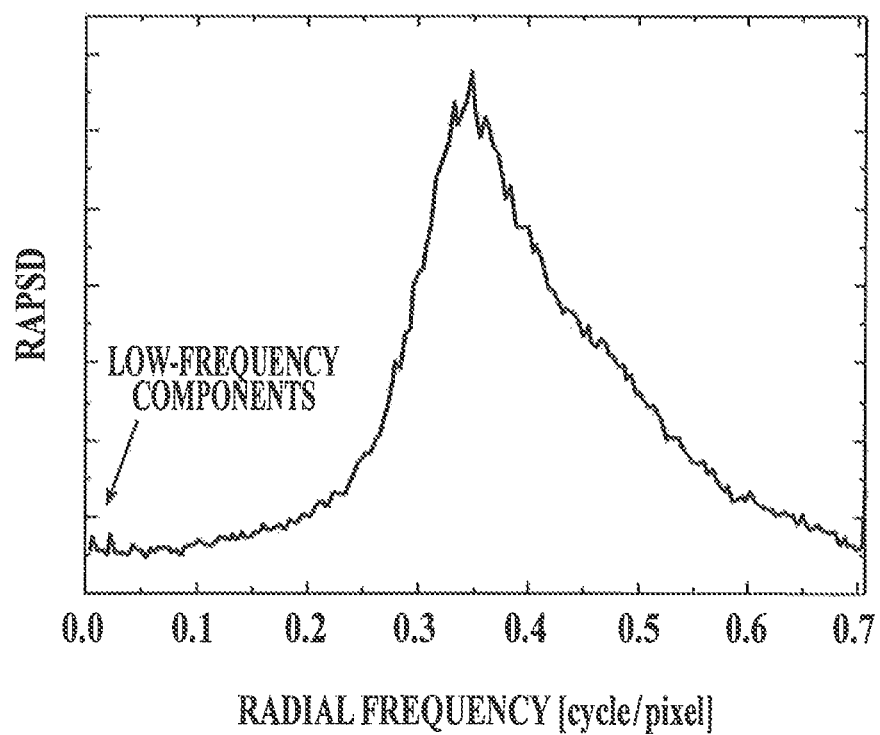
FIG. 36 This is a graph illustrating RAPSD corresponding to the dot pattern illustrated in FIG. 35.
Figure 37:
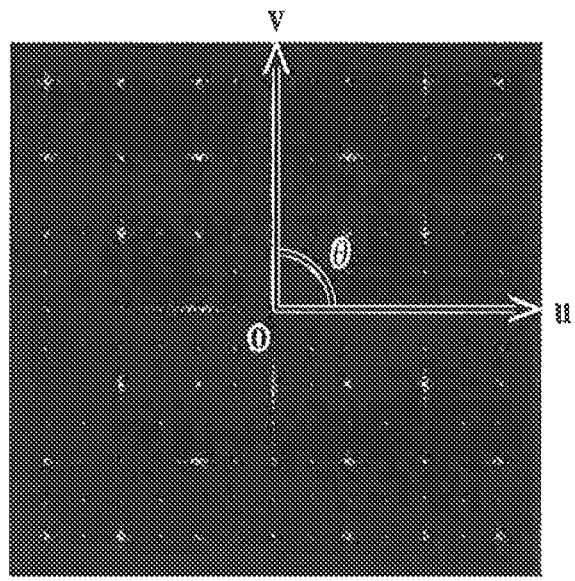
FIG. 37 This is a drawing illustrating two-dimensional spatial frequency distribution of the dot pattern illustrated in FIG. 35.
Figure 38:
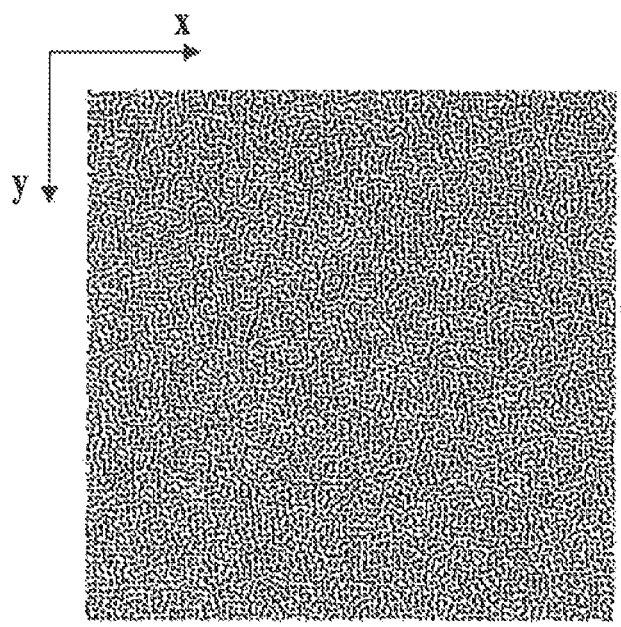
FIG. 38 This is a drawing illustrating an exemplary dot pattern (256×256 [pixels]) with g=0.5, generated by the conventional isotropic space filter method.

FIG. 32 illustrates a configuration of the image forming device 300.

As illustrated in FIG. 32, the image forming device 300 has the quantizer 200 and an image forming unit 301.

The image forming unit 301 forms an image on a recording medium, based on quantized image data output by the quantizer 200.

Methods (systems) of forming an image by the image forming unit 301 are exemplified by electronic photograph system, thermal transfer system, inkjet system, dot impact system and so forth, but may arbitrarily be selected without being limited thereto, so long as it can form the output image data obtained by the quantizer 200 on a recording medium.

The image forming device 300 of this embodiment can form an output image data having the dot pattern showing almost uniform dot arrangement over all discrete blocks on a recording medium. In addition, the present invention can solve a known drawback of the method of generating a threshold matrix described in Patent Document 3, such that the generated threshold matrix only yields a poor distribution of the dot pattern due to a strict restriction on the arrangement of dots, and produces nonuniformity in density in the dithered image, and can thereby form the dithered output image data more successfully reduced in nonuniformity in density on a recording medium.

The process of generating the threshold matrix in the individual embodiments, having been described as being executed by a software process on a computer, may alternatively be executed on a dedicated device.

Alternatively, the computer which executes the process of generating a threshold matrix may execute any process other than the process of generating a threshold matrix. For example, a general-purpose computer such as a personal computer may generate the threshold matrix, or a CPU incorporated in instruments such as MFP (Multifunction Peripheral) may execute the process of generating a threshold matrix as one of the processes.

Alternatively, the individual configurations of the quantizer 200 may be implemented by software processing.

Still alternatively, value other than MSE may be used as the dot dispersion evaluation value. For example, RAPSD may be multiplied by a spectral luminous efficiency curve and then integrated with respect to frequency to thereby calculate a noise value, and the swapping of dot arrangement may be terminated if the noise value satisfies a predetermined condition (falls below a predetermined value, for example).

INDUSTRIAL APPLICABILITY

The present invention is applicable to the field of image formation based on multi-gradation image.

EXPLANATION OF THE MARKS

11 CPU
12 RAM
13 ROM
14 storage device

What is claimed is:

1. A method of generating a threshold matrix used for determining a state of formation of a plurality of dots composing an output image, the method comprising the steps of:
generating a new dot pattern as a second dot pattern obtained by increasing or decreasing the number of dots of a first dot pattern having a predetermined number of dots in an pixel area of a predetermined size;
rearranging the dots contained in the second dot pattern to obtain a third dot pattern having the dots rearranged therein; and
repeating the generating of the new dot pattern while redefining the third dot pattern as the first dot pattern and the rearranging until a dot pattern having the number of dots based on a desired dot ratio is obtained; wherein the rearranging further includes:
a dot pattern evaluation value calculating process calculating a dot pattern evaluation value based on a difference between the second dot pattern and a dot pattern obtained by subjecting the second dot pattern to a predetermined filtering aimed at implementing a desired spatial frequency, in a manner corresponding to each location in the threshold matrix;
a first uniformity evaluation value calculating process calculating a first uniformity evaluation value each representing uniformity of the number of dots of first discrete blocks obtained by dividing the pixel area of a predetermined size;
a dot rearrangement location determining process determining new locations of placement of dots and locations of deletion of dots in the process of rearrangement of dots, based on the dot pattern evaluation value and the first uniformity evaluation value;
a rearrangement pattern generating process rearranging the dots of the third dot pattern, based on the new locations of placement of dots and the locations of deletion of dots determined in the rearrangement location determining process;
a dot dispersion evaluation value calculating process calculating a dot dispersion evaluation value with respect to the rearranged third dot pattern;
a rearrangement repetition determining process determining whether repetition of the dot pattern evaluation value calculating process, the first uniformity evaluation value calculating process, the dot rearrangement location determining process, the rearrangement pattern generating process and the dot dispersion evaluation value calculating process are performed or not, based on the dot dispersion evaluation value of the rearranged third dot pattern; and
a process redefining the rearranged third dot pattern as the second dot pattern, if the repetition was determined in the rearrangement repetition determining process.

2. The method of generating a threshold matrix according to claim 1,
wherein the dot dispersion evaluation value is a pattern deviation value of a pattern obtained by applying a spatial frequency filter to the third dot pattern, wherein the filter allows at least low-frequency components to pass therethrough, and
in the rearrangement repetition determining process, the repetition of the dot pattern evaluation value calculating process, the first uniformity evaluation value calculating process, the dot rearrangement location determining process, the rearrangement pattern generating process and the dot dispersion evaluation value calculating process is determined, if the pattern deviation obtained after the rearrangement pattern generating process is smaller than the pattern deviation obtained before the rearrangement pattern generating process.

3. The method of generating a threshold matrix according to claim 1,
wherein the dot dispersion evaluation value is a noise value obtained by applying a spatial frequency filter allowing low-frequency components to pass therethrough to the third dot pattern and by integrating the output with respect to the entire frequency components, and
in the rearrangement repetition determining process, the repetition of the dot pattern evaluation value calculating process, the first uniformity evaluation value calculating process, the dot rearrangement location determining process, the rearrangement pattern generating process and the dot dispersion evaluation value calculating process is determined, if the noise value obtained after the rearrangement pattern generating process is smaller than the noise value obtained before the rearrangement pattern generating process.

4. The method of generating a threshold matrix according to claim 1,
wherein size of the first discrete block varies depending on gradation value of the dot pattern.

5. The method of generating a threshold matrix according to claim 1,
wherein the uniformity evaluation value calculating process calculates a second uniformity evaluation value each representing uniformity of the number of dots of second discrete blocks obtained by dividing the pixel area of the predetermined size and having a size different from that of the first discrete blocks; and
the dot rearrangement location determining process determines the new locations of placement of dots and the locations of deletion of dots in the process of rearrangement of dots, based on the dot pattern evaluation value, the first uniformity evaluation value and the second uniformity evaluation value.

6. A threshold matrix generating device used for generating a threshold matrix used for determining a state of formation of a plurality of dots composing an output image,
the threshold matrix generating device having a control unit which generates a second dot pattern obtained by increasing or decreasing the number of dots of a first dot pattern having a predetermined number of dots in an pixel area of a predetermined size; obtains a third dot pattern having rearranged therein the dots contained in the second dot pattern; and repeats the process of generating the second dot pattern while redefining the third dot pattern as the first dot pattern and the process of obtaining the third dot pattern until a dot pattern having the number of dots based on a desired dot ratio is obtained,
in the process of obtaining the third dot pattern,
the control unit calculates a dot pattern evaluation value based on a difference between the second dot pattern and a dot pattern obtained by subjecting the second dot pattern to a predetermined filtering aimed at implementing a desired spatial frequency in a manner corresponding to each location in the threshold matrix; calculates a uniformity evaluation value representing uniformity of the number of dots of discrete blocks obtained by dividing the pixel area of a predetermined size; determines new locations of placement of dots and locations of deletion of dots in the process of rearrangement of dots, based on the dot pattern evaluation value and the uniformity evaluation value; rearranges the dots of the third dot pattern, based on the determined new locations of placement of dots and the determined locations of deletion of dots; calculates a dot dispersion evaluation value with respect to the rearranged third dot pattern; determines whether repetition of the calculation process of the dot pattern evaluation value, the calculation process of the uniformity evaluation value, the determination process of the new locations of placement of dots and the locations of deletion of dots, the rearrangement process of the third dot pattern, and the calculation process of the dot dispersion evaluation value are performed or not, based on the dot dispersion evaluation value of the rearranged third dot pattern; and redefines the rearranged third dot pattern as the second dot pattern, if repetition was determined.

7. A quantizer which generates an output image data based on an input image data having three or a larger predetermined number of gradation, the number of gradation of the output image data being smaller than the predetermined number, the quantizer comprising:
a storage unit which stores a threshold matrix;
a comparator unit which compares a pixel value of the input image data and a threshold value of a threshold matrix stored in the storage unit; and
an output unit which generates and outputs the output image data based on a result of comparison by the comparator unit,
the threshold matrix being generated by summing a plurality of dot patterns, for every pixel composing each of the dot patterns,
each of the plurality of dot patterns having dots, the number of which corresponds to a dot ratio representing a ratio of the number of pixels having the dots formed therein relative to the total number of pixels contained in a predetermined pixel area, and, corresponding to each of the dot ratios ranging from 0 to a predetermined value generated under stacking constraint conditions, and
when the radial average power spectrum density distribution relative to the spatial frequency of at least a dot pattern of the individual dot patterns having the dot ratio of 0.5 is fitted by a third-order polynomial in the region of a spatial frequency of 0.1 [cycles/pixel] or below, the fitted curve has an inflection point in the region, and decreases in the region of a spatial frequency of 0.05 [cycles/pixel] or below as the spatial frequency decreases.

8. An image forming device which generates an output image data based on an input image data having three or a larger predetermined number of gradation, the number of gradation of the output image data being smaller than the predetermined number, and forms an image on a recording medium based on the output image data, the image forming device comprising:
a quantizer, which includes:
a storage unit which stores a threshold matrix;
a comparator unit which compares a pixel value of the input image data and a threshold value of a threshold matrix stored in the storage unit; and
an output unit which generates and outputs the output image data based on a result of comparison by the comparator unit, and
an image forming unit which forms the image on the recording medium based on the output image data output by the quantizer,
the threshold matrix being generated by summing a plurality of dot patterns, for every pixel composing each of the dot patterns,
each of the plurality of dot patterns having dots, the number of which corresponds to a dot ratio representing a ratio of the number of pixels having the dots formed therein relative to the total number of pixels contained in a predetermined pixel area, and, corresponding to each of the dot ratios ranging from 0 to a predetermined value generated under stacking constraint conditions, and
when the radial average power spectrum density distribution relative to the spatial frequency of at least a dot pattern of the individual dot patterns having the dot ratio of 0.5 is fitted by a third-order polynomial in the region of a spatial frequency of 0.1 [cycles/pixel] or below, the fitted curve has an inflection point in the region, and decreases in the region of a spatial frequency of 0.05 [cycles/pixel] or below as the spatial frequency decreases.

9. A non-transitory storage device that stores a computer program comprising computer implementable steps for generating a threshold matrix used for determining a state of formation of a plurality of dots composing an output image, the computer implementable steps comprising:

generating a new dot pattern as a second dot pattern obtained by increasing or decreasing the number of dots of a first dot pattern having a predetermined number of dots in an pixel area of a predetermined size;

rearranging the dots contained in the second dot pattern to obtain a third dot pattern having the dots rearranged therein; and repeating the generating of the new dot pattern while redefining the third dot pattern as the first dot pattern and the rearranging until a dot pattern having the number of dots based on a desired dot ratio is obtained; wherein the rearranging further includes:

a dot pattern evaluation value calculating process calculating a dot pattern evaluation value based on a difference between the second dot pattern and a dot pattern obtained by subjecting the second dot pattern to a predetermined filtering aimed at implementing a desired spatial frequency, in a manner corresponding to each location in the threshold matrix;

a first uniformity evaluation value calculating process calculating a first uniformity evaluation value each representing uniformity of the number of dots of first discrete blocks obtained by dividing the pixel area of a predetermined size;

a dot rearrangement location determining process determining new locations of placement of dots and locations of deletion of dots in the process of rearrangement of dots, based on the dot pattern evaluation value and the first uniformity evaluation value;

a rearrangement pattern generating process rearranging the dots of the third dot pattern, based on the new locations of placement of dots and the locations of deletion of dots determined in the rearrangement location determining process;

a dot dispersion evaluation value calculating process calculating a dot dispersion evaluation value with respect to the rearranged third dot pattern;

a rearrangement repetition determining process determining whether repetition of the dot pattern evaluation value calculating process, the first uniformity evaluation value calculating process, the dot rearrangement location determining process, the rearrangement pattern generating process and the dot dispersion evaluation value calculating process are performed or not, based on the dot dispersion evaluation value of the rearranged third dot pattern; and a process redefining the rearranged third dot pattern as the second dot pattern, if the repetition was determined in the rearrangement repetition determining process.

* * * * *